(12) United States Patent
Boettcher et al.

(10) Patent No.: US 8,960,776 B2
(45) Date of Patent: Feb. 24, 2015

(54) VEHICLE BED FRAME ASSEMBLY, SYSTEM AND METHOD

(75) Inventors: Eric Boettcher, Columbus, OH (US); Ceby Philip, Powell, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 12/614,207

(22) Filed: Nov. 6, 2009

(65) Prior Publication Data

US 2010/0078968 A1    Apr. 1, 2010

Related U.S. Application Data

(63) Continuation-in-part of application No. 11/738,010, filed on Apr. 20, 2007, now abandoned.

(51) Int. Cl.
| | | |
|---|---|---|
| B62D 25/08 | (2006.01) | |
| B62D 25/20 | (2006.01) | |
| B62D 33/023 | (2006.01) | |
| B62D 33/027 | (2006.01) | |

(52) U.S. Cl.
CPC .......... B62D 33/023 (2013.01); B62D 33/0273 (2013.01)
USPC ...... 296/193.07; 296/29; 296/204; 296/26.08

(58) Field of Classification Search
USPC ............... 296/193.09, 193.07, 187.1, 187.09, 296/184.1, 204, 203.02, 203.01, 209, 29, 296/183.1, 26.08
See application file for complete search history.

(56) References Cited

U.S. PATENT DOCUMENTS

| | | | |
|---|---|---|---|
| 1,826,960 A | 10/1929 | Simning | |
| 3,534,977 A | 10/1970 | Wessel | |
| 4,099,313 A | 7/1978 | Phillips | |
| 4,589,181 A | 5/1986 | Phillips | |
| 4,898,419 A * | 2/1990 | Kenmochi et al. | 296/204 |
| 5,149,132 A * | 9/1992 | Ruehl et al. | 280/800 |
| 5,613,727 A | 3/1997 | Yamazaki | |
| 5,632,508 A | 5/1997 | Jacobs et al. | |
| 5,829,824 A | 11/1998 | Yamamuro et al. | |
| 5,839,776 A | 11/1998 | Clausen et al. | |
| 6,010,182 A * | 1/2000 | Townsend | 296/203.01 |
| 6,123,378 A | 9/2000 | Teply et al. | |
| 6,139,094 A | 10/2000 | Teply et al. | |
| 6,398,260 B1 | 6/2002 | Rinehart | |
| 6,533,348 B1 * | 3/2003 | Jaekel et al. | 296/205 |
| 6,540,279 B1 | 4/2003 | Bargiel | |

(Continued)

FOREIGN PATENT DOCUMENTS

| | | |
|---|---|---|
| FR | 729542 | 7/1932 |
| FR | 987481 | 8/1951 |
| WO | 9925599 | 5/1999 |

OTHER PUBLICATIONS

Office Action dated Dec. 13, 2010 in association with related U.S. Appl. No. 12/614,196.

(Continued)

*Primary Examiner* — Dennis H Pedder
(74) *Attorney, Agent, or Firm* — Rankin, Hill & Clark LLP

(57) ABSTRACT

A vehicle frame assembly, system and method includes a vehicle frame assembly having a variable length longitudinal frame component. The longitudinal frame component is formed at a first length when used on a first vehicle type and formed at a second length when used on a second vehicle type.

12 Claims, 16 Drawing Sheets

(56) References Cited

U.S. PATENT DOCUMENTS

| | | |
|---|---|---|
| 6,616,217 B1 | 9/2003 | Robinson |
| 6,679,546 B2 | 1/2004 | Mishima et al. |
| 6,742,832 B1 * | 6/2004 | Miskech et al. .......... 296/183.1 |
| 6,824,204 B2 | 11/2004 | Gabbianelli et al. |
| 6,857,692 B2 | 2/2005 | Cardimen et al. |
| 6,938,950 B2 | 9/2005 | Nagafuchi et al. |
| 7,192,071 B2 | 3/2007 | Watanabe et al. |
| 7,469,957 B1 | 12/2008 | Boettcher |
| 7,699,385 B2 | 4/2010 | Kurata |
| 7,823,964 B2 | 11/2010 | Tasumi et al. |
| 2001/0050497 A1 * | 12/2001 | Jaekel et al. ................. 296/205 |
| 2004/0239091 A1 | 12/2004 | Horton et al. |
| 2005/0056667 A1 | 3/2005 | McClure et al. |
| 2005/0082346 A1 | 4/2005 | McNulty et al. |
| 2005/0116460 A1 | 6/2005 | McGill et al. |
| 2005/0134095 A1 | 6/2005 | Mayer et al. |
| 2005/0151394 A1 | 7/2005 | Grueneklee et al. |
| 2005/0168008 A1 * | 8/2005 | Robbins ................... 296/136.07 |
| 2005/0229528 A1 | 10/2005 | Kardosz et al. |
| 2005/0236867 A1 | 10/2005 | McNulty et al. |
| 2005/0242620 A1 | 11/2005 | McNulty et al. |
| 2006/0001285 A1 | 1/2006 | Patberg |
| 2006/0001294 A1 | 1/2006 | Balgaard et al. |
| 2006/0006699 A1 | 1/2006 | Matsuyama et al. |
| 2006/0082191 A1 | 4/2006 | McNulty et al. |
| 2007/0138840 A1 | 6/2007 | Caliskan et al. |
| 2007/0194564 A1 | 8/2007 | Garceau et al. |
| 2008/0023953 A1 | 1/2008 | Horton et al. |
| 2008/0042469 A1 * | 2/2008 | McNulty et al. .......... 296/183.1 |
| 2008/0258498 A1 | 10/2008 | Philip et al. |
| 2010/0096888 A1 | 4/2010 | Cox |
| 2010/0207425 A1 | 8/2010 | Ben-Ari et al. |

OTHER PUBLICATIONS

Office Action dated Dec. 23, 2010 in association with related U.S. Appl. No. 12/614,173.
International Search Report of PCT Appln. No. PCT/US2010/055434 dated Jan. 10, 2011.
Written Opinion of PCT Appln. No. PCT/US2010/055434 dated Jan. 10, 2011.
Office Action dated Apr. 4, 2011 in association with related U.S. Appl. No. 12/614,173.
Office Action dated Apr. 4, 2011 in association with related U.S. Appl. No. 12/614,196.
Office Action of U.S. Appl. No. 12/614,173 dated Aug. 24, 2011.
Office Action of U.S. Appl. No. 12/614,173 dated Jan. 12, 2012.
Office Action of U.S. Appl. No. 12/614,186 dated Apr. 13, 2012.
Office Action of U.S. Appl. No. 12/614,196 dated May 27, 2011.
Office Action of U.S. Appl. No. 12/614,186 dated Jul. 3, 2012.

* cited by examiner

FIG. 32
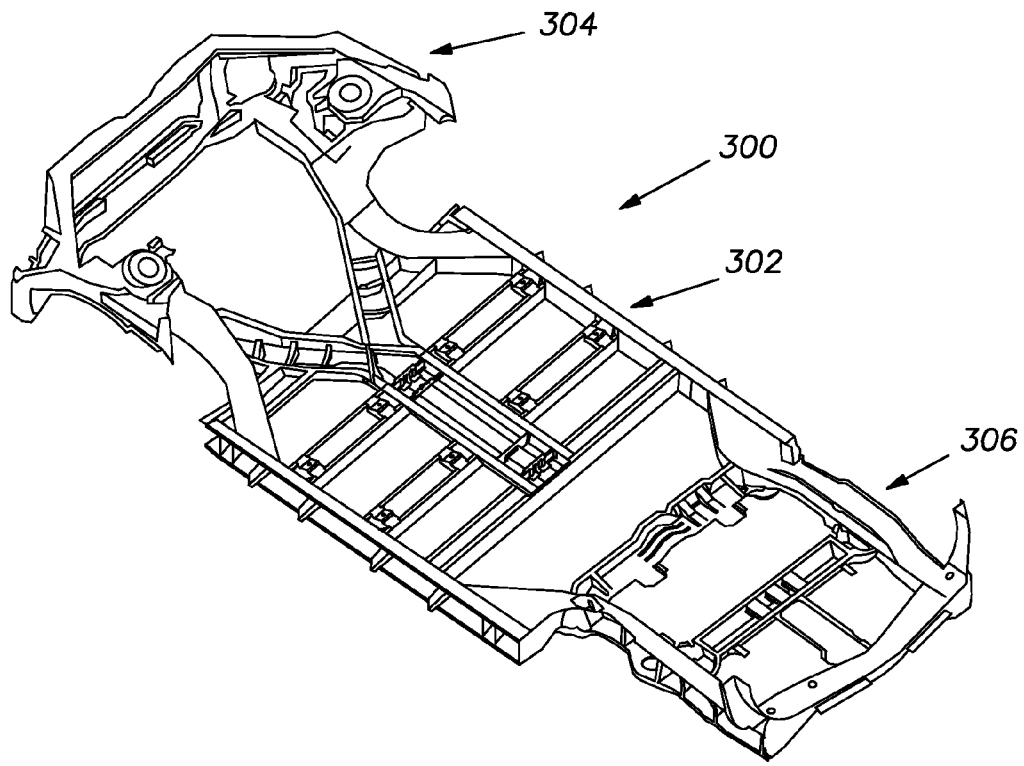
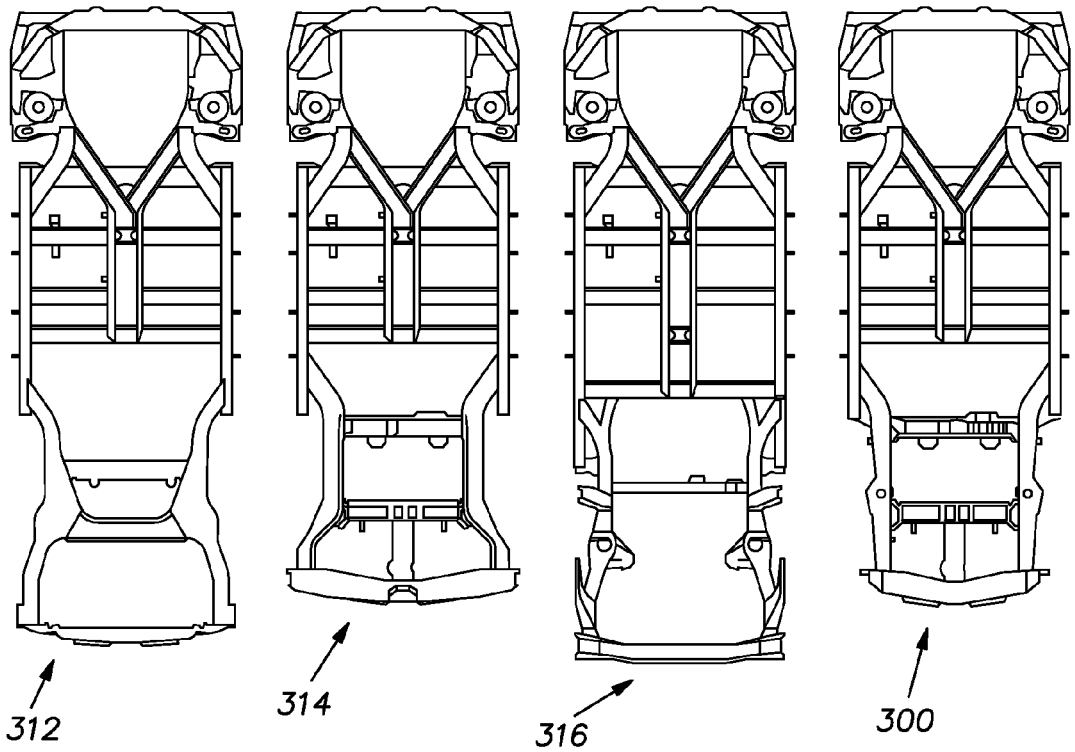
FIG. 33

VEHICLE BED FRAME ASSEMBLY, SYSTEM AND METHOD

CROSS REFERENCE TO RELATED APPLICATIONS

This application is a continuation-in-part of U.S. patent application Ser. No. 11/738,010 filed Apr. 20, 2007 and is related to U.S. Pat. No. 7,469,957, both expressly incorporated herein by reference. This application is also related to the following applications filed concurrently herewith and expressly incorporated herein by reference: U.S. patent application Ser. No. 12/614,173 (Vehicle Frame Assembly, System and Method); U.S. patent application Ser. No. 12/614,186 (Vehicle Frame Side Sill Joints); and U.S. patent application Ser. No. 12/614,196 (Vehicle Center Frame Member Joints).

BACKGROUND

Exemplary embodiments herein generally relate to vehicle frame assemblies. Across different vehicle models or types, it can be desirable to have many different vehicle lengths, or particular sections of such vehicles with many different lengths. For example, in a pickup truck, a cab area may include two full-sized doors, four full-sized doors, or two full-sized doors and two half-sized doors and a bed length of this type of vehicle can vary, e.g., from about 1.2 meters to about 2.4 meters. Accordingly, many possible combinations of cab length and bed length are possible. Of course, other types of vehicles can have variable lengths or sections with variable lengths, such as sport utility trucks, sport utility vehicles, minivans, crossovers, sedans, coupes, etc.

In conventional vehicle frames and constructions thereof, each such combination is a different vehicle model having a dedicated frame structure. Providing each vehicle model with its own dedicated frame structure, which conventionally is assembled from a collection of stamped parts, can be expensive and can make it difficult to efficiently manufacture several variable length vehicles on a single assembly line.

Some vehicle manufacturers employ a body-on-frame construction to provide some limited flexibility in varying vehicle designs. When body-on-frame construction techniques are employed, complete body assemblies (e.g., a cab structure or a bed structure) are mounted to a ladder frame. This allows the completed body assemblies to be modified and/or substituted without substantially changing the underlying ladder frame and/or other completed body assemblies mounted to the ladder frame. In the case of pickup trucks, for example, a cab assembly can be redesigned from one model year to the next without requiring substantial redesigning of the underlying ladder frame. In addition, a single ladder frame can support different types of cabs (regular, extended cab or full size) and/or different types of beds. In addition, ladder frames can be extended or lengthened by adding an auxiliary ladder frame to the main ladder frame. This could be used to support an extended bed or cab, or could be used to support an elongated vehicle (e.g., a livery vehicle). Drawbacks of body-on-frame designs include weight concerns causing lower performance and higher fuel consumption, compromised handling due to lack of torsion flexing and less ability to incorporate crumble zones for improved crash safety.

SUMMARY

According to one aspect, a floor frame system for use on a plurality of vehicle types having varying longitudinal floor lengths includes at least a first vehicle type having a first floor frame assembly with a first longitudinal length and at least a second vehicle type having a second floor frame assembly with a second longitudinal length that is longer than the first longitudinal length. The first floor frame assembly includes a center frame member, a pair of side sill members flanking the center frame member and a plurality of cross members extending between the side sill members and interconnected to the center frame. The second floor frame assembly includes a center frame member, a pair of side sill members flanking the center frame member and a plurality of cross members extending between the side sill members and interconnected to the center frame member.

One or more of the center frame member of the first and second floor frame assemblies and the side sill members of the first and second floor frame assemblies has a cross-sectional profile that remains constant along at least a longitudinal portion thereof allowing the one or more members to be cut a first location along the longitudinal portion corresponding to the first longitudinal length when included the first floor frame assembly and at a second location along the longitudinal portion corresponding to the second longitudinal length when included in the second floor frame assembly.

According to another aspect, a floor frame assembly for a vehicle includes a center frame member, side sill members flanking and spaced apart from the center frame member, and a plurality of spaced apart cross members extending between and interconnecting the side sill members and the center frame member. One or more of the center frame member and the side sill members has a cross-sectional profile that remains constant along at least a longitudinal portion thereof. The longitudinal portion has a first portion length when installed on a first vehicle type having a first floor frame longitudinal length and a second portion length when installed on a second vehicle type having a second floor frame longitudinal length.

According to still another aspect, a floor frame system includes a floor frame assembly having a roll-formed longitudinal frame component. The roll-formed longitudinal frame component is formed at a first length when used on a first vehicle type having a first floor assembly with a first longitudinal length and formed at a second length when used on a second vehicle type having a second floor assembly with a second longitudinal length.

According to a further aspect, a frame system for a vehicle includes a vehicle frame assembly having a roll-formed longitudinal frame component. The roll-formed longitudinal frame component is formed at a first length when used on a first vehicle type and formed at a second length when used on a second vehicle type.

According to still a further aspect, a frame construction method for forming vehicle frames having varying longitudinal floor lengths is provided. In the method according to this aspect, at least one first longitudinal frame component having a defined cross-section of a first longitudinal length is formed for a first vehicle type. The longitudinal frame component is installed on a first floor frame assembly of the first vehicle type. Also, at least one second longitudinal component having the defined cross-section of a second longitudinal length is formed for a second vehicle type. The second longitudinal component is installed on a second floor frame assembly of the second vehicle type.

In a vehicle frame assembly having a front frame assembly comprised of a front frame cross member and front frame side members extending rearwardly from the front frame cross member, and a floor frame assembly comprised of side sill members connected at forward end portions to the front frame side members and a plurality of cross members extending between the side sill members, a frame joint, between a first front frame side member of the front frame side members and a first side sill member of the side sill members includes, according to one aspect, an upper wall of the first front frame side member overlapping an upper wall of the first side sill member along a region where the first front frame side member meets with the first side sill member, and a lower wall of the first front frame side member overlapping a lower wall of the first side sill member along the region.

In a vehicle frame assembly having a rear frame assembly comprised of at least one rear frame cross brace and rear frame side members extending forwardly from the at least one rear frame cross brace, and a floor frame assembly comprised of side sill members connected at rearward end portions to the rear frame side members and a plurality of cross members extending between the side sill members, a frame joint between a first rear frame side member of the rear frame side members and a first side sill member of the side sill members includes, according to one aspect, an upper wall of the first rear frame side member overlapping an upper wall of the first side sill member along a region where the first rear frame side member mates with the first side sill member and a lower wall of the first rear frame side member overlapping a lower wall of the first side sill member along the region.

According to another aspect, a vehicle frame joint includes a side sill member of a floor frame assembly and a forward or rearward frame side member angularly oriented relative to the side sill member and connected to the side sill member to transfer load forces thereto. The frame side member has an upper wall overlapping an upper wall of the side sill member along a region where the frame side member mates with the side sill member and a lower wall overlapping a lower side sill wall of the side sill member along the region.

In a vehicle frame assembly having a floor frame assembly comprised of side sill members and a plurality of cross members extending between the side sill members, a frame joint between a first cross member of the plurality of cross members and a first side sill member of the side sill members includes, according to one aspect, an upper wall of the first cross member overlapping an upper wall of the first side sill member along a region where the first cross member mates with the first side sill member and a lower wall of the first cross member overlapping a lower wall of the first side sill member along the region.

According to still another aspect, a vehicle frame joint includes a side sill member of a floor frame assembly and a connecting frame member having an upper wall overlapping an upper wall of the side sill member along a region where the connecting frame member mates with the side sill member and a lower wall overlapping a lower wall of the side sill member along the region.

In a vehicle frame assembly having a front frame assembly comprised of a front frame cross member and first and second inner members extending rearwardly from the front frame cross member, and a floor frame assembly comprised of side sill members, a center frame member and a plurality of cross members extending between and interconnecting the side sill members and the center frame member, a frame joint between the first and second inner members and the center frame member includes, according to one aspect, first and second spaced apart side walls of the center frame member integrally formed with and extending from a center wall of the center frame member. First and second spaced apart side walls of the first inner member are integrally formed with and extend from a center wall of the first inner member. The first side wall of the first inner member is contiguous with and blends into the first side wall of the center frame member and the second side wall of the first inner member is contiguous with and blends into the second side wall of the center frame member. First and second spaced apart side walls of the second inner member are integrally formed with and extend from a center wall of the second inner member. The first side wall of the second inner member terminates at the second side wall of the first inner member and the second side wall of the second inner member is contiguous with and blends into the second side wall of the center frame member thereby providing a primary load path from the first inner member to the center frame member and a secondary load path from the second inner member to the center frame member.

In a vehicle frame assembly having side sill members, a center frame member and a plurality of cross members extending between and interconnecting the side sill members and the center frame member, a frame joint between at least one cross member of the plurality of cross members and the center frame member includes, according to one aspect, a first segment of the at least one cross member spanning between a first side sill member of the side sill members and the center frame member and a second segment of the at least one cross member spanning between a second, opposite side sill member of the side sill members and the center frame member. A lower wall of each of the first and second segments overlaps a lower wall of the center frame member. An upper wall of each of the first and second segments overlaps an upper wall of the center frame member.

According to a further aspect, a vehicle frame joint includes a center frame member of a floor frame assembly and a cross member segment connected to the center frame member and extending laterally toward an associated side sill member. The cross member segment has a lower wall overlapping a lower wall of the center frame member and an upper wall overlapping an upper wall of the center frame member.

According to one aspect, a bed frame system for use on a plurality of vehicle types having varying longitudinal bed lengths includes at least a first vehicle type having a first front frame assembly, a first floor frame assembly, and a first rear frame assembly, and at least a second vehicle type having a second front frame assembly, a second floor frame assembly, and a second rear frame assembly. The first rear frame assembly includes at least one longitudinal frame member having a first longitudinal length. The second rear frame assembly includes at least one longitudinal frame member having a second longitudinal length. One or more of the longitudinal frame members of the first and second rear frame assemblies has a cross-sectional profile that remains constant along at least longitudinal portion thereof allowing the one or more members to be cut at a first location along the longitudinal portion corresponding to the first longitudinal length when included in the first rear frame assembly and at a second location along the longitudinal portion corresponding to the second longitudinal length when included in the second rear frame assembly.

According to another aspect, a bed frame assembly for a vehicle includes at least one longitudinal frame member having a cross-sectional profile that remains constant along at least a longitudinal portion thereof. The longitudinal portion has a first portion length when installed on a first vehicle type having a first bed frame longitudinal length and a second portion length when installed on a second vehicle type having a second bed frame longitudinal length.

According to still another aspect, a bed frame system includes a bed frame assembly having a role-formed longitudinal frame component. The roll-formed longitudinal frame component is formed at a first length when used on a first vehicle type having a first floor frame assembly with a first longitudinal length and formed at a second length when used on a second vehicle type having a second floor frame assembly with a second longitudinal length.

According to a further aspect, a bed frame construction method is provided for forming vehicle bed frames having varying longitudinal bed lengths. In the method according to this aspect, at least one first longitudinal frame component having a defined cross-section of a first longitudinal length for a first vehicle type is formed. The first longitudinal frame component is installed on a first bed frame assembly of the first vehicle type. Also, at least one second longitudinal frame component having the defined cross-section is formed of a second longitudinal length for a second vehicle type. The second longitudinal component is installed on a second bed frame assembly of the second vehicle type.

BRIEF DESCRIPTION OF THE DRAWINGS

FIG. 32 is a perspective view of an underside portion of a vehicle frame having a rear frame assembly suitable for use in a SUV vehicle.

FIG. 33 is a schematic plan view showing vehicle frame assemblies with alternate rear frame assemblies.

DETAILED DESCRIPTION

Figure 30:
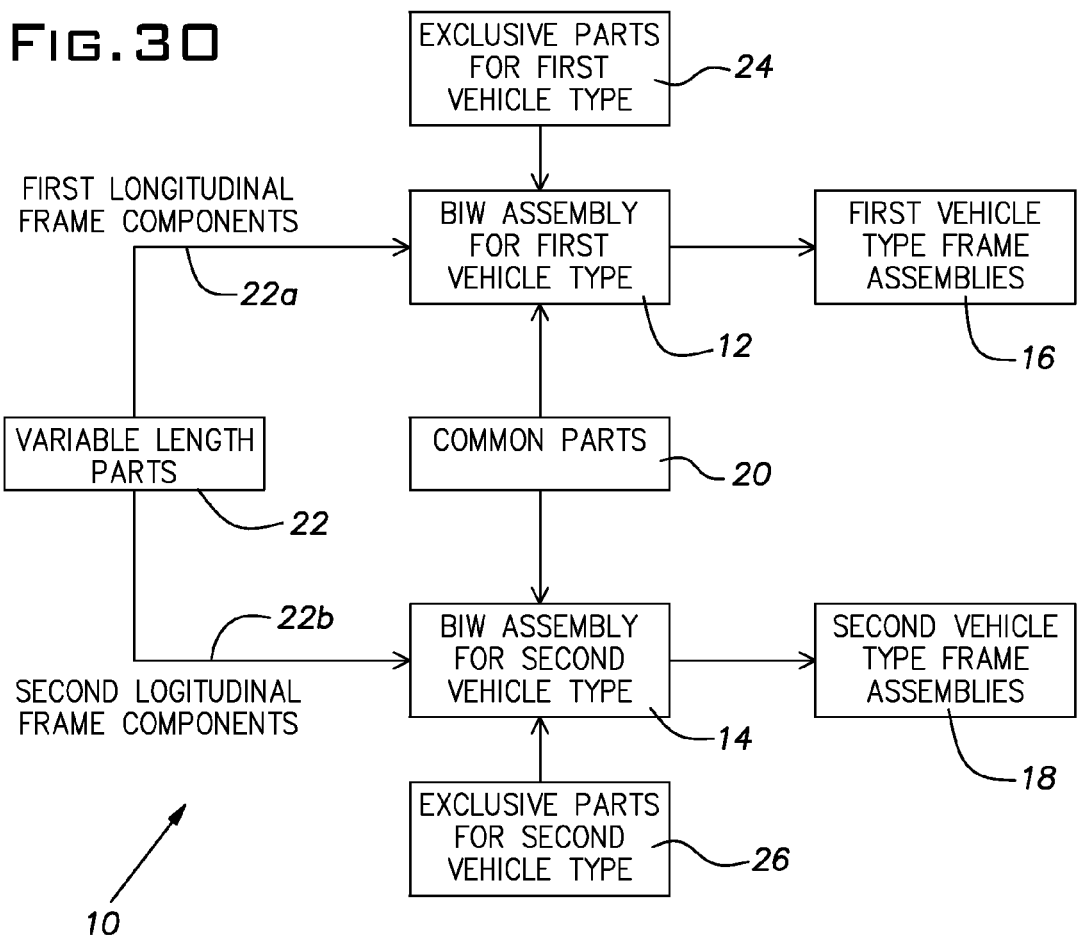
FIG. 30 is a schematic view of a frame system for building vehicle frame assemblies for first and second vehicle types comprised of exclusive parts, common parts and variable length parts.

Referring now to the drawings, wherein the showings are for purposes of illustrating one or more exemplary embodiments and not for purposes of limiting same, FIG. 30 schematically shows a frame system 10 for a vehicle, and particularly for use on or in connection with a plurality of vehicle types having varying longitudinal frame lengths, including overall frame length, frame section length and/or frame component length. As illustrated, body-in-white (BIW) assembly for at least a first vehicle type occurs at 12 and BIW assembly for at least a second vehicle type occurs at 14. From the BIW assembly 12, vehicle frame assemblies result for at least the first vehicle type as indicated at 16. Likewise, vehicle frame assemblies for at least the second vehicle type result from the BIW assembly 14 as indicated at 18. As used herein, vehicle type is used simply to distinguish between vehicle frame assemblies. In some cases, vehicle type can be associated with different vehicle models; however in other cases a single vehicle model can comprise multiple vehicle types and thus different frame assemblies.

As shown, the vehicle frame assemblies 16, 18 can be formed at 12 and 14 from common parts 20, variable length parts 22 and exclusive or custom parts 24, 26. The common parts 20 can be, for example, stamped components that are used on a variety of vehicle types, particularly the vehicle frame assemblies 16, 18 of at least the first vehicle type and the at least a second vehicle type in the illustrated embodiment. The variable length parts 22 can include longitudinal frame components that have a cross-sectional profile that remains constant along at least a longitudinal portion thereof allowing these parts to be commonly formed for variable length frame assemblies of different vehicle types and cut at different locations for forming these parts of variable lengths. For example, the variable length parts 22a that are provided to the BIW assembly 12 can be longitudinal frame components having a first longitudinal length, whereas the variable length parts 22b provided to the BIW assembly 14 can be longitudinal frame components having a second longitudinal length. These longitudinal frame components 22a, 22b can have common cross-sections and thus amenable to being formed of varying longitudinal lengths in a cost effective manner.

In one example, the longitudinal frame components 22a, 22b are roll-formed components formed by a roll-form process and cut to a desired length (e.g., a first longitudinal length for the first vehicle type and a second longitudinal length for the second vehicle type). Roll-forming could be the process used when the longitudinal components 22a, 22b are formed of steel, for example, though this is not required. In another example, the longitudinal components are extruded components formed by an extrusion process and cut to a desired length (e.g., a first longitudinal length for the first vehicle type and a second longitudinal length for the second vehicle type). Extrusion could be the process used when the longitudinal components are formed of aluminum, for example, though this is not required. In still another example, some other process could be used to form the variable length longitudinal components, including but not limited to press braking, stamping, etc.

The custom or exclusive parts 24, 26 can be stamped, roll-formed, extruded or otherwise formed, and are generally used on less than all vehicle types or models (i.e., making them "exclusive" to a particular vehicle type or types). For example, the parts 24 can be exclusive to only the first vehicle type assembled at 12 and the parts 26 can be exclusive to only the second vehicle type assembled at 14. In the illustrated embodiment, the first vehicle type vehicle frame assemblies 16 can have roll-formed longitudinal frame components 22a having first longitudinal lengths and the second vehicle type frame assemblies 18 can have roll-formed longitudinal frame components 22b with second longitudinal lengths. Accordingly, roll-form longitudinal frame components can be formed at 22, particularly formed at a first length when used on the first vehicle type in 12 and formed at a second, longer length when used on the second vehicle type in 14, though other forming processes could be employed (e.g., extrusion, press brake, etc.).

Figure 1:
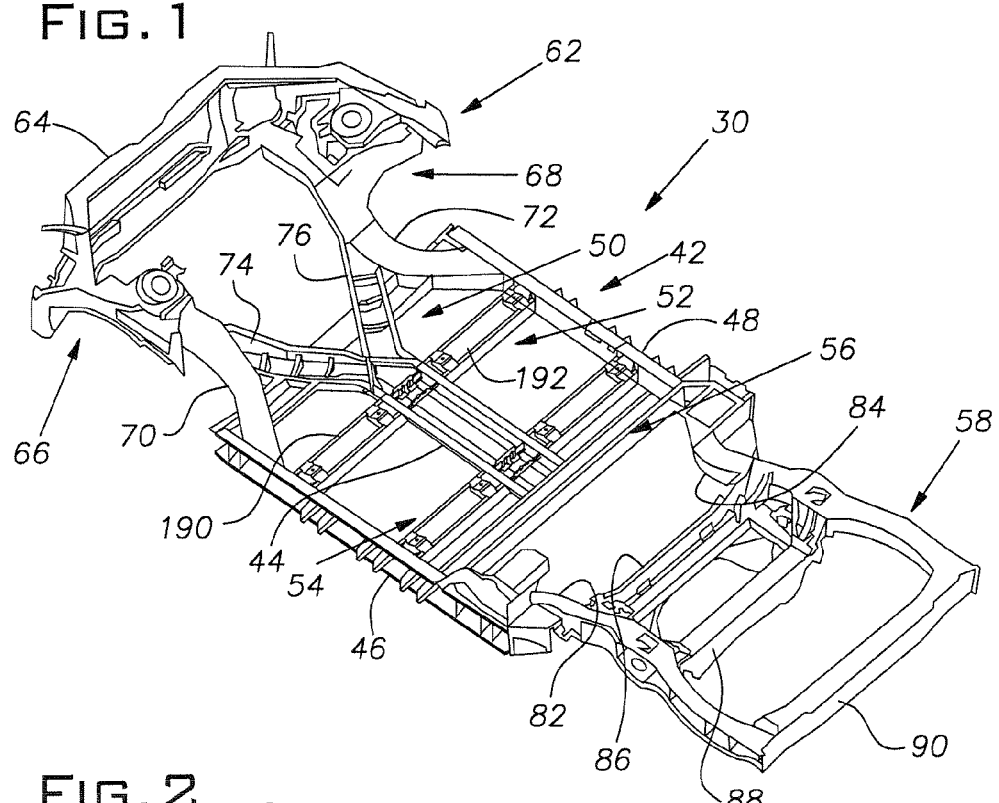
FIG. 1 is a perspective view of an underside portion of a vehicle frame for a first vehicle type comprised of a first floor frame assembly and a first bed frame assembly.
Figure 2:
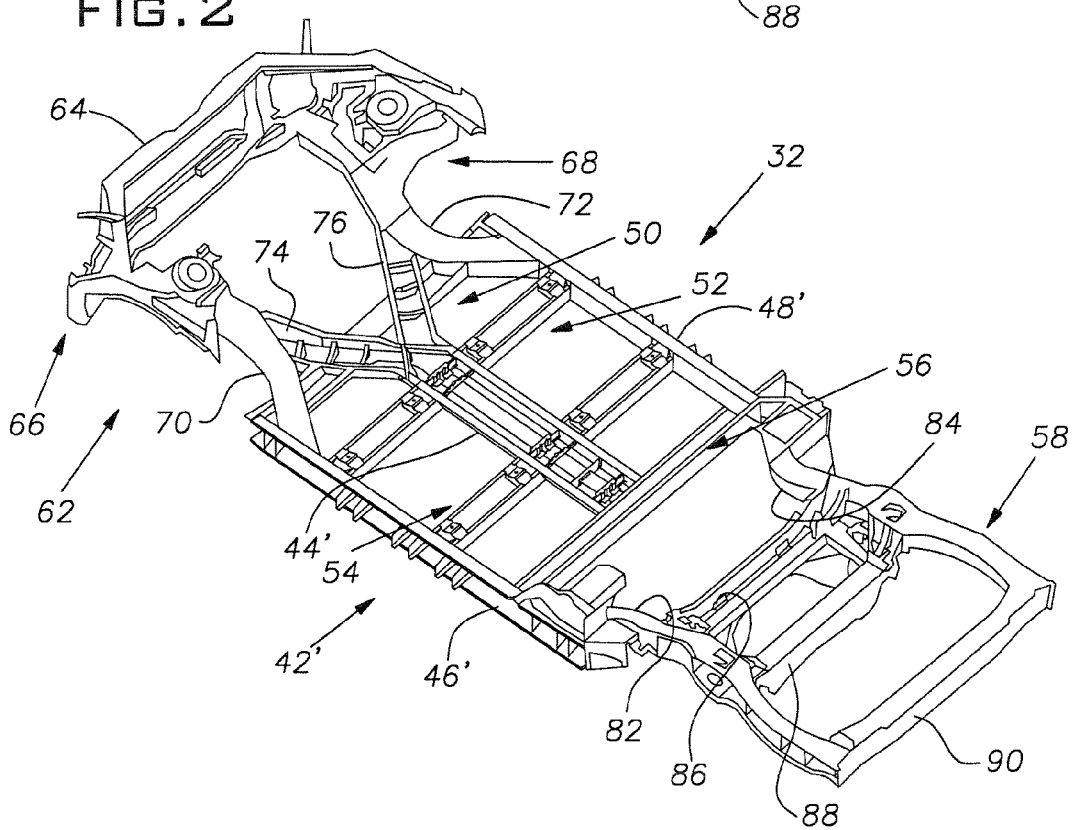
FIG. 2 is a perspective view of an underside portion of a vehicle frame for a second vehicle type comprised of a second floor frame assembly and the first bed frame assembly.
Figure 3:
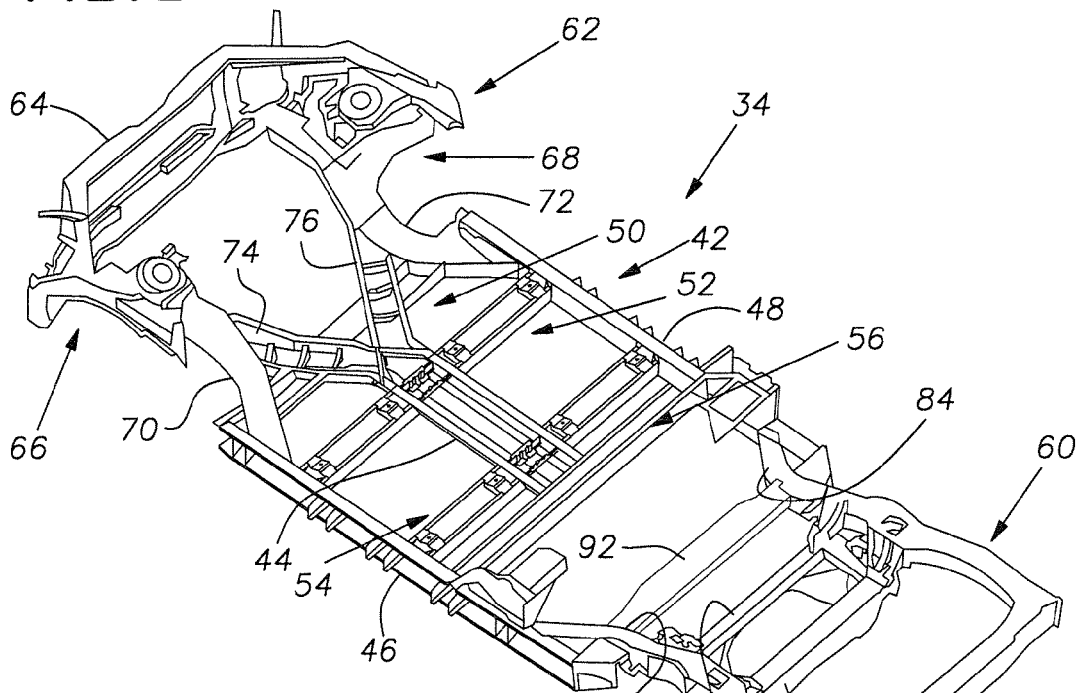
FIG. 3 is a perspective view of an underside portion of a vehicle frame for a third vehicle type comprised of the first floor frame assembly and the second bed frame assembly.
Figure 4:
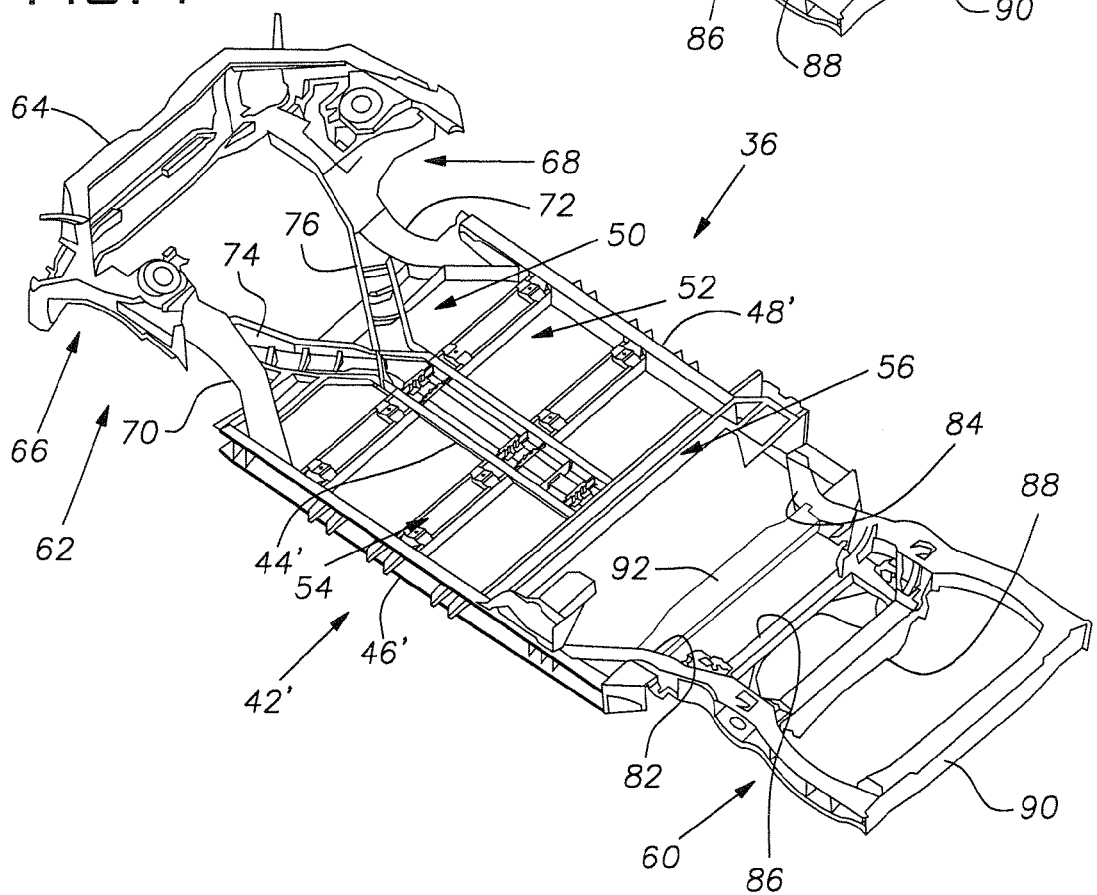
FIG. 4 is a perspective view of an underside portion of a vehicle frame for a fourth vehicle type comprised of the second floor frame and the second bed frame assembly.

Turning to FIGS. 1-4, vehicle frame assemblies 30-36, or at least underside portions thereof, are shown for four vehicle types. More specifically, FIG. 1 illustrates a frame assembly 30 for a first vehicle type, which could be employed as the underside portion of the first vehicle type frame assemblies 16 in FIG. 31. FIG. 2 illustrates a frame assembly 32 for a second vehicle type, which could be employed as the underside portion of the second vehicle frame assemblies 18 in FIG. 31. FIG. 3 illustrates a frame assembly 34 for a third vehicle type and FIG. 4 illustrates a frame assembly 36 for a fourth vehicle type. Of course, the use of four vehicle types in FIGS. 1-4 is merely illustrative as more or less than four vehicle types could be employed in the framing system(s) disclosed herein. In any case, each of the illustrated frame assemblies 30-36 can be formed from common parts, variable length parts and exclusive parts as described in connection with the vehicle frame system of FIG. 31.

In particular, the common parts can be parts that are identical and used on multiple frame assemblies for multiple vehicle types. For example, a common part, such as a floor frame cross member, could be used on all four of the frame assemblies 30-36 of FIGS. 1-4. Variable length parts (e.g., roll-formed parts, extruded parts, press brake parts, etc.) are those parts having cross-sectional profiles that remain constant along at least a longitudinal portion thereof and can be cut to a desired length for use on different vehicle types. Finally, exclusive parts can be those parts that are specifically formed for use on a particular vehicle type or on less than all vehicle types. In the FIGS., common parts will generally be described once and their reference numbers will generally be identical on all of the drawings. Variable length parts will also generally be described once with like reference numbers used on all of the drawings, however a prime symbol (') will be used to distinguish between variable length parts having different longitudinal lengths (and to distinguish between subassemblies including variable length parts). Custom parts, which are only used on some vehicle types, will be described individually as they relate to the particular vehicle type (or types) on which they are used.

The illustrated frame assemblies 30-36 will be described for use in association with sport utility trucks (e.g., pickup trucks), though this is merely illustrative and it is to be appreciated by those skilled in the art that the concepts of the subject disclosure could easily be adapted to other classes of vehicles, such as sport utility vehicles, vans, cars, crossovers, etc. The frame assembly 30 of the first vehicle type has a first floor frame assembly 42 with a first longitudinal length. The first floor frame assembly 42 includes a center frame member 44, a pair of side sill members 46, 48 flanking the center frame member 44 and a plurality of cross-members 50, 52, 54, 56 extending between the side sill members 46, 48 and interconnected to the center frame member 44. The frame assembly 32 of FIG. 2 for the second vehicle type has a second floor frame assembly 42' with a second longitudinal length that is longer than the first longitudinal length of the first floor frame assembly 42 of FIG. 1. The second floor frame assembly 42' includes a center frame member 44', a pair of side sill members 46', 48' flanking the center frame member 44' and the same plurality of cross members 50, 52, 54, 56 extending between the side sill members 46' 48' and interconnected to the center frame member 44'. As will be described in more detail below, each of the cross-members 50, 52, 54, 56 can be generally U-shaped in cross-section and can have a forward wall, a rearward wall, and lower wall interconnecting the forward and rearward walls, which can also be referred to as side walls.

One or more of the center frame members 44, 44' of the first and second floor frame assemblies 42, 42' and the side sill members 46, 48 and 46', 48' of the first and second floor frame assemblies 42, 42' can have a cross-sectional profile that remains constant along at least a longitudinal portion thereof allowing the one or members to be cut at a first location along the longitudinal portion corresponding to the first longitudinal length when included in the first floor frame assembly 42 and at a second location along the longitudinal portion corresponding to the second longitudinal length when included in the second floor frame assembly 42'. In the illustrated embodiment, the longitudinal portion of the one or members is an entire longitudinal extent thereof, though this is not required. Moreover, as described in reference to the variable length parts 22 of FIG. 31, the one or more members having varying longitudinal lengths can be roll-formed members.

In the illustrated embodiment, the one or more members can include all of the center frame members 44, 44' and the side sill members 46, 48 and 46', 48'. As an example, the center frame members 44, 44' can be roll-formed and merely cut at different lengths as appropriate for use on the respective floor frame assemblies 42, 42'. Likewise, the side sill members 46, 46' can be roll-formed and cut to the appropriate lengths for use on the respective floor frame assemblies 42, 42' and the side sill members 48, 48' can be roll-formed and cut to the appropriate lengths for use on the floor frame assemblies 42, 42'. The cross-members 50-56 of the each of the floor frame assemblies 42, 42' can be common with one another (i.e., common parts). That is, a plurality of cross members 50, for example, can be formed and one cross-member of this plurality can be used on the floor frame assembly 42 and another of this plurality can be used on the floor frame assembly 42'. As a result, the floor frame assembly 42' has a longer longitudinal length than the floor frame assembly 42. This could be used, for example, to support varying cab structures. For example, the floor frame assembly 42 of FIG. 1 could be used in a vehicle type having four doors, including two full-size front doors and two smaller rear doors, though this is not required. By comparison, the floor frame assembly 42' of FIG. 2 could be used for a vehicle type having four full-size doors, though this too is not required.

One of a plurality of rear frame assemblies can be secured to each of the first floor frame assembly 42 of the first vehicle type and the second floor frame assembly 42' of the second vehicle type. In particular, a common rear frame assembly 58 is shown secured respectively to the floor frame assemblies 42, 42' by connecting to rearward ends of the side sill members 46, 48 and 46', 48'. In the illustrated embodiment, the rear frame assembly 58 can be an underside frame portion for a load-carrying bed frame (e.g., about 5 foot or 1.2 meter bed). Alternatively, other rear frame assemblies could be connected to the floor frame assemblies 42, 42'.

For example, with reference to FIGS. 3 and 4, an elongated rear frame assembly 60 is shown connected, respectively, to the floor frame assemblies 42, 42'. The rear frame assembly 60 can be, for example, the underside portion of an elongated load-carrying bed frame (e.g., about a 6 foot or 2.4 meter bed). Except for the rear frame assembly 60, the underside frame assembly 34 of FIG. 3 is the same as the underside frame assembly 30 of FIG. 1 and the underside frame assembly 36 of FIG. 4 is the same as the underside frame assembly 32 of FIG. 2. Accordingly, in FIGS. 1 and 2, first rear frame assembly 58 having a first longitudinal length is secured to the floor frame assemblies 42, 42' and, in FIGS. 3 and 4, second rear frame assembly 60 having a second longitudinal length that varies relative to the first longitudinal length (e.g., is longer) is secured to the floor frame assemblies 42, 42'.

Another example is shown in FIG. 32, wherein a frame assembly 300 includes a floor frame assembly 302 having a front frame assembly 304 and a rear frame assembly 306 attached thereto. As is illustrated, the rear frame assembly 306 can be specific to a sport utility vehicle (SUV), for example. The floor frame assembly 302 could be one of the floor frame assemblies 42 or 42' and the front frame assembly 304 could be the same front frame assembly as illustrated in FIGS. 1-4. With further reference to FIG. 33, the frame assembly 300 is shown again along with a plurality of other frame assemblies 312, 314 and 316. These other frame assemblies are illustrated to show that many different types of rear frame assemblies can be used with the subject disclosure. For example, the frame assembly 312 includes a rear frame assembly specific to a minivan, the frame assembly 314 includes a rear frame assembly specific to another SUV, and the frame assembly 16 includes a rear frame assembly specific to another sport utility truck (SUT). Of course, other variations are possible.

In the vehicle frame assemblies 30-36 of FIGS. 1-4, a common front frame assembly 62 is secured to each of the floor frame assemblies 42 and 42', though this is not required. As will be appreciated by those skilled in the art, through employing a common front frame assembly 62 and/or employing common rear frame assemblies 58 or 60 across a number of different vehicle types, economies are gained due to the use of a complete subassembly, which can be formed by welding a group of stamped parts together, and then installed on a variety of vehicle types. Taken together, each of the vehicle frame assemblies 30-36 includes the front frame assembly 62 that extends in front of the vehicle firewall, the center or floor frame assembly 42 or 42', which defines a cab or passenger compartment of the vehicle, and the rearward or bed frame assembly 58 or 60, which extends rearwardly from the floor frame assembly 42 or 42' along the rear portion of the vehicle (i.e., rear passenger compartment or bed, for example). Together, these frame assemblies or subassemblies can form an underside of a unibody frame for the assembled vehicle.

By the foregoing, a floor frame system is provided wherein a frame assembly, such as floor frame assembly 42 or 42', includes at least one variable length longitudinal frame component, such one or more variable length roll-formed longitudinal frame components, for example. These longitudinal frame components can include the center frame members 44, 44' and/or the side sill members 46, 46' and/or 48, 48'. The longitudinal frame components can be formed at a first length when used on a first vehicle type having a first floor frame assembly with a first longitudinal length (e.g., the first floor frame assembly 42) and formed at a second length when used on the second vehicle type having a second floor frame assembly with a second longitudinal length (e.g., floor frame assembly 42'). In one exemplary embodiment, the longitudinal frame components are roll-formed and include at least one of the first side sill member 46, 46', the second side sill member 48, 48' or the center frame member 44, 44'. In another exemplary embodiment, the roll-formed longitudinal frame components include both center frame members 44 and 44' and all of the side sill members 46, 46', 48, 48'. In a further exemplary embodiment, the longitudinal frame components, e.g., members 44, 44', 46, 46', 48, 48') are formed by a process other than roll forming (e.g., extrusion, press braking, stamping, etc.) and then cut to the desired lengths.

In the illustrated floor frame assemblies 42 and 42', the center frame members 44 and 44', as well as the side sill members 46, 46' and 48, 48', extend along a substantial portion of the longitudinal lengths of the first and second floor frame assemblies, 42, 42'. In particular, in the illustrated floor frame assemblies 42 and 42', the side sill members 46, 46' and 48, 48' extend along an entire longitudinal extent of the respective floor frame longitudinal lengths. These roll-formed longitudinal components can have cross-sections that remain constant along entire longitudinal lengths thereof, though this is not required.

The front frame assembly 62 that is common to all of the illustrated vehicle frame assemblies 30-36 typically defines at least a portion of an engine room. The front frame assembly 62 is secured to respective forward portions of the center frame member 44 or 44' and the side sill members 46, 48 or 46', 48'. In the illustrated embodiment, the front frame assembly 62 includes a front frame cross-member 64 and front frame side members 66, 68 that extend rearwardly from the front frame cross-member 64. As is known and understood by those skilled in the art, the side members 66, 68 can include portions to support the front suspension of the vehicle. In addition, the side members 66, 68 include first and second outer arms 70, 72 that, respectively, extend rearwardly and downwardly toward the first and second side sill members 46, 48 (or 46', 48'), and include first and second inner arms 74, 76 that, respectively, extend downwardly and inwardly toward the center frame member 44 (or 44'). As will be described in more detail below, the inner arms 70, 72 merge with one another and the center frame member 44 (or 44') to form a Y-shaped center joint that is disposed along a longitudinal centerline of the vehicle. The outer arms 74, 76 merge with forward ends of the side sill members 46, 48 (or 46', 48') and the cross-member 30, the forward-most cross member, to form front frame to side sill frame joints described in further detail below.

As already mentioned, the rear frame assemblies 58 or 60 can be formed in various lengths to accommodate elongated beds of varying lengths and/or elongated rear passenger compartments of varying lengths, though this is not required. Both rear frame assemblies 58,60 include rear frame side members 82, 84 and a plurality of cross braces 86, 88, 90 extending therebetween. The side frame members 82, 84 extend from the side sill members 46, 48 (or 46', 48') to the rear cross brace 90. The cross braces 86, 88, 90 include front cross brace 86, middle cross brace 88, and rear cross brace 90. The front and middle cross braces 86, 88 cooperate to define supports for the rear wheels and the rear suspension (not shown). The rear cross brace 90 extends between rear or distal ends of the side frame members 82, 82. On the longer rear frame assembly 60 shown in FIGS. 3 and 4, a supplementary cross brace 92 also extends between the side members 82, 84.

Figure 31:
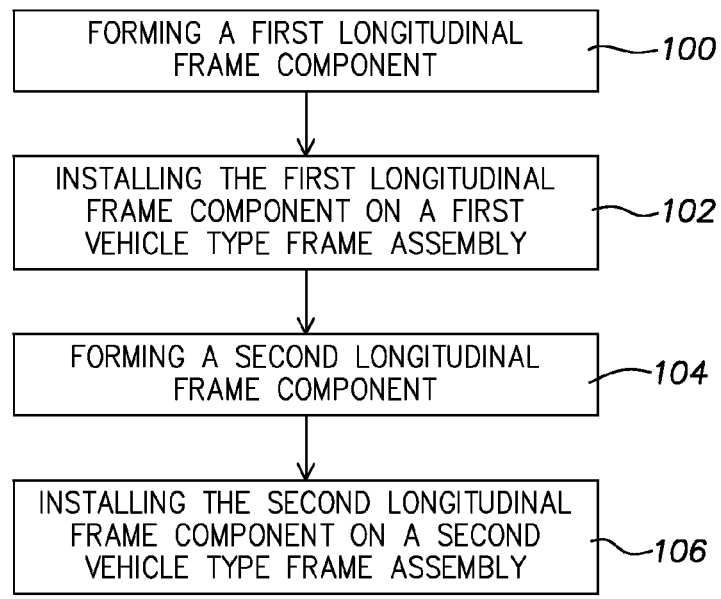
FIG. 31 is a process flow diagram showing a frame construction method for forming vehicle frames having varying longitudinal lengths.

With brief reference to FIG. 31, a frame construction method will now be described for forming vehicle frames, and will now be particularly described in relation vehicle floor frames assemblies that have varying longitudinal lengths (e.g., vehicle floor frame assemblies 42 and 42'). In 100, at least one first longitudinal frame component having a defined cross-section of a first longitudinal length is formed for a first vehicle type. As already described, this could include the center frame member 44 and/or the side sill members 46, 48 in the illustrated embodiment. The formed longitudinal frame component or components are then installed in 102 on a first floor frame assembly of the first vehicle type (e.g., first floor frame assembly 42). In 104, at least one second longitudinal component having the same defined cross-section is formed of a second longitudinal length for a second vehicle type. This could include the center frame member 44' and/or the side sill members 46', 48' in the illustrated embodiment. In 106, the formed second longitudinal frame component or components are installed on the second floor frame assembly of the second vehicle type (e.g., the second floor frame assembly 42').

By this method, longitudinal frame components can be formed for different vehicle types wherein the longitudinal frame components have different longitudinal lengths. The same longitudinal frame component (e.g., center frame member or side sill member) can be formed at a first length for a first vehicle type and at a second length for a second vehicle type. Such forming can include roll-forming the frame components or could include some other forming process (e.g., extrusion, press brake forming, stamping, etc.). The longitudinal frame components can have cross-section profiles that are constant along at least a longitudinal portion of the components, or along an entire longitudinal extent of the components as is common in parts formed by at least roll-forming and extrusion techniques.

The described method allows floor frame assemblies (e.g., floor frame assemblies 42 and 42') to be economically formed of different longitudinal lengths, which otherwise may not be economical, e.g., when floor frame assemblies are formed entirely from custom-made stamped parts. Instead, using the foregoing method, floor frame assemblies can be formed from a plurality of common stamped parts together with variable length parts (e.g., roll-formed parts), which can be desirably cut to predetermined lengths according to the desired length of the vehicle type (or a frame section thereof) in which the frame component or part is to be incorporated. If needed, an additional number of custom or exclusive parts can be used to accommodate other aspects of a particular vehicle type.

In the illustrated embodiment, the first floor frame assembly 42 of FIGS. 1 and 2 includes the front cross-member 50, disposed forwardly adjacent the Y-shaped center joint, the first and second side sill members 46, 48 extending longitudinally at the lateral sides of the first floor frame assembly, the center frame member 44, the second cross-member 52 disposed rearwardly adjacent the Y-shaped center joint, the intermediate cross-member 54 disposed rearwardly of the second cross-member 52, and the rear cross-member 56 disposed at a rearward end of the center frame member 44. On the floor frame assemblies 42' of FIGS. 2 and 4, which can be used to accommodate larger cab areas, such as those fitted with four full-sized doors, the side sill members 46', 48' are used as these extend rearwardly a greater distance beyond the rear cross-member 56 than those on the relatively shorter floor frame assembly 42. Also, the center frame member 44' is used as it extends rearwardly a greater distance to bridge the wider gap between the cross members 54 and 56 on the second floor frame assembly 42'. In both of the floor frame assemblies 42, 42', the front ends of the side sill members 46, 48 or 46', 48' are connected to the front frame assembly 64 and the rear ends of the side sills are connected to the rear frame assembly 58 (or 60).

As already mentioned, the center frame members 44 and 44', the first side sill members 46 and 46', and the second side sill members 48 and 48' of the illustrated embodiments have respective matching cross-sections along entire longitudinal extents, though this in not required. Specifically, in the illustrated embodiment, the center frame members 44 and 44' have matching cross-sections with one another, the first side sill members 46 and 46' have matching cross-sections with one another, and the second side sill members 48 and 48' have matching cross-sections with one another. Accordingly, further details will only be provided in connection with the members 44, 46 and 48 of the first frame assembly 42 and, unless indicated otherwise these further details are equally applicable to the members 44', 46', 48' of the second frame assembly 42'.

With reference specifically to FIG. 1, each of the side members 46, 48 is an elongated continuous frame member having a generally C-shaped cross-section with an open side of the respective side sill member facing laterally away from the vehicle. As will be described in further detail below, the open interior of the side sill members 46, 48 can hold one or more bulkheads. A portion of a doorframe member 110 (FIGS. 24-27) can be disposed over the open side of each of the side sill members 46, 48 and can serve as an outer cover thereof. The side sill members 46, 48 can connect to the front frame assembly 64, the rear frame assembly 58 (or 60) and the cross members 50-56 through a plurality of frame joints, particularly vehicle frame side sill joints that will be described in further detail below.

The center frame member 44 can be situated approximately halfway between the side sill members 46, 48 so as to generally extend along the longitudinal centerline of the vehicle. Specifically, with brief reference to FIGS. 9 and 10, the center frame member 44 can include a pair of side walls 44a, 44b extending upwardly from a center or base wall 44c. The center frame member 44 can also include an upper wall formed as a pair of flanges 204, 206 extending from distal portions of the side walls 44a, 44b. The lower wall 44c can include a recess 44d providing the center frame member 44 with a generally W-shaped cross-section The recess 44c can accommodate a center bearing and a drive shaft (neither component shown). The center frame member 44 can be connected to the cross-members 50-56 and to the front frame assembly 64 through a plurality of joints, particularly vehicle center frame joints that will be described in further detail below.

Exemplary vehicle frame side sill joints are shown in FIGS. 5-8 and 14-20. As will be described below, each of these joints includes one of the side sill members 46 or 48 and at least one connecting frame member (e.g., outer arms 70,72 of the front frame assembly side members 66, 68, side members 82, 84 of the rear frame assembly 58, the cross members 50-56, etc.). In each joint, the connecting frame member has an upper wall overlapping an upper wall of the side sill member 46 or 48 along a region where the connecting frame member mates with the side sill member 46 or 48 and a lower wall overlapping a lower wall of the side sill member 46 or 48 along the same region. All overlapping relations between frame components can serve as suitable weld locations for welding mating frame components to one another, though other connection methods could be used. While each side sill joint described below is described in detail in connection with the first side sill member 46 and the adjacent frame component connected thereto, it is to be appreciated and understood that a like joint is formed between the second side sill member 48 and a corresponding connecting frame component, though no further discussion of these other joints is provided.

Figure 14:
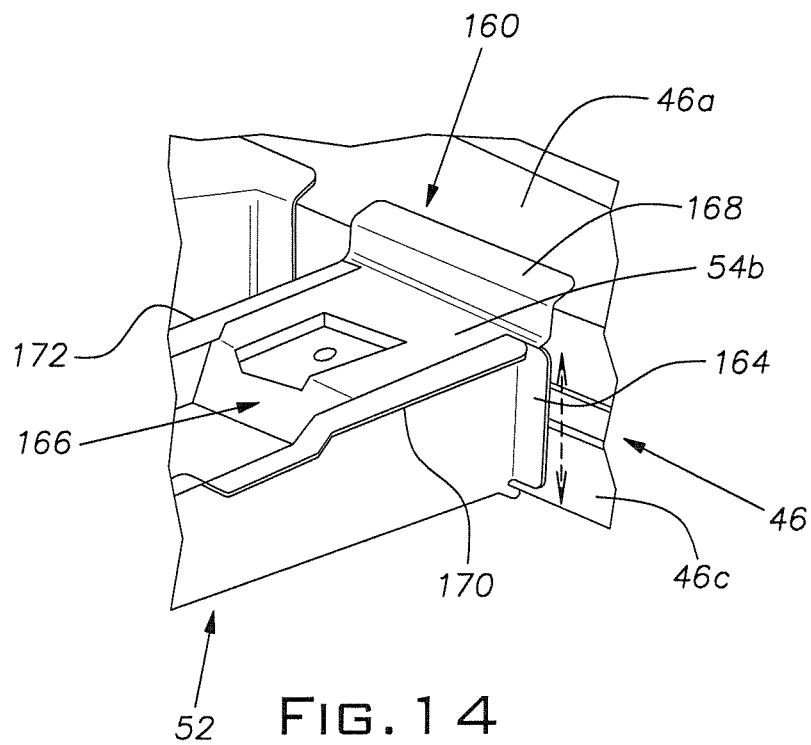
FIG. 14 is a perspective view of a frame joint between a cross member and a side sill member, both of a floor frame assembly.
Figure 15:
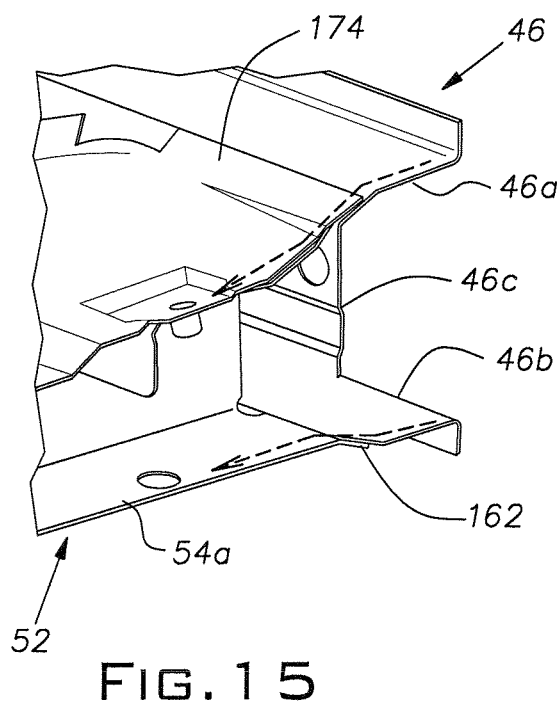
FIG. 15 is a sectional view of the frame joint of FIG. 14 with a floor panel attached thereto.
Figure 16:
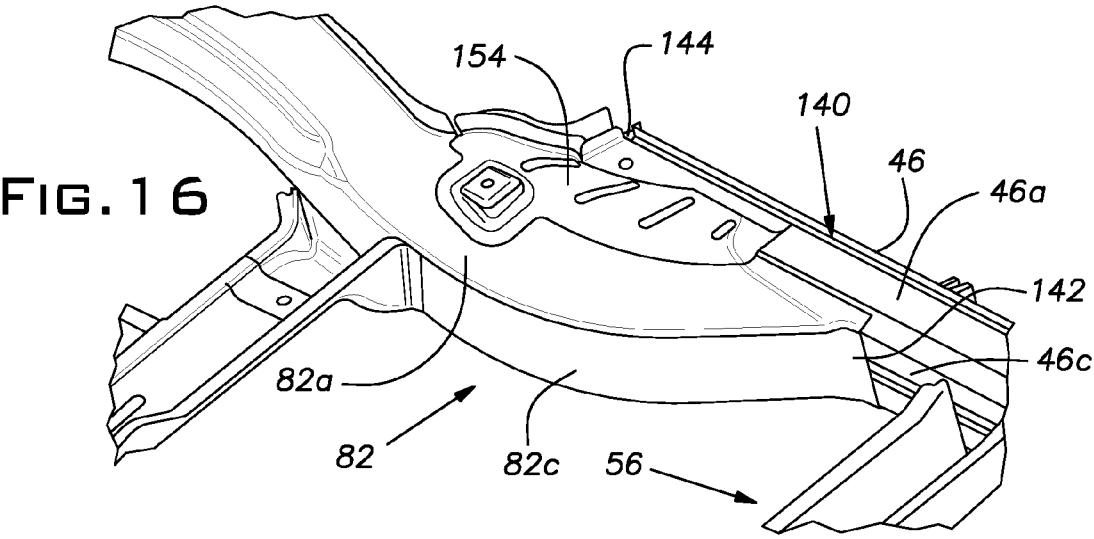
FIG. 16 is a perspective view of a frame joint between a side member of a rear frame assembly and a side sill member of a floor frame assembly.
Figure 17:
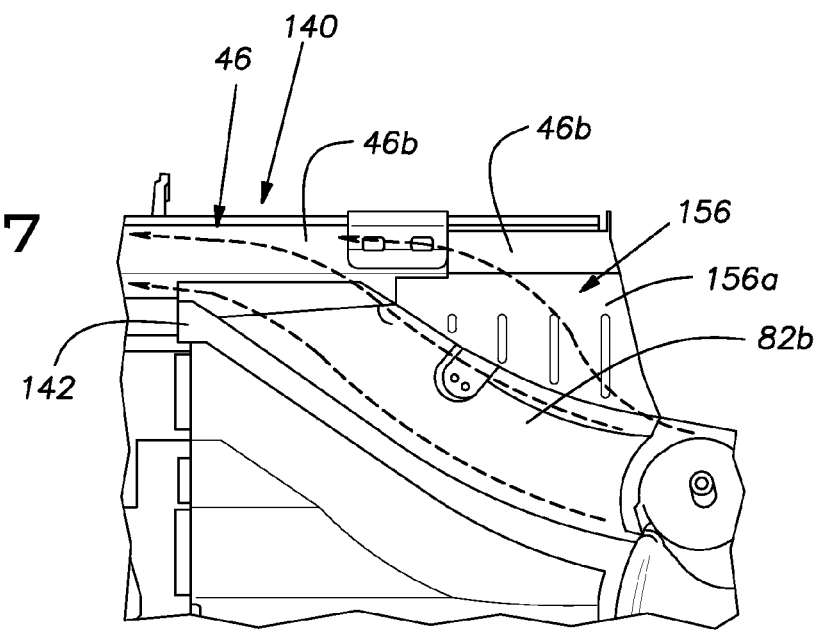
FIG. 17 is a bottom plan view of the frame joint of FIG. 16.
Figure 18:
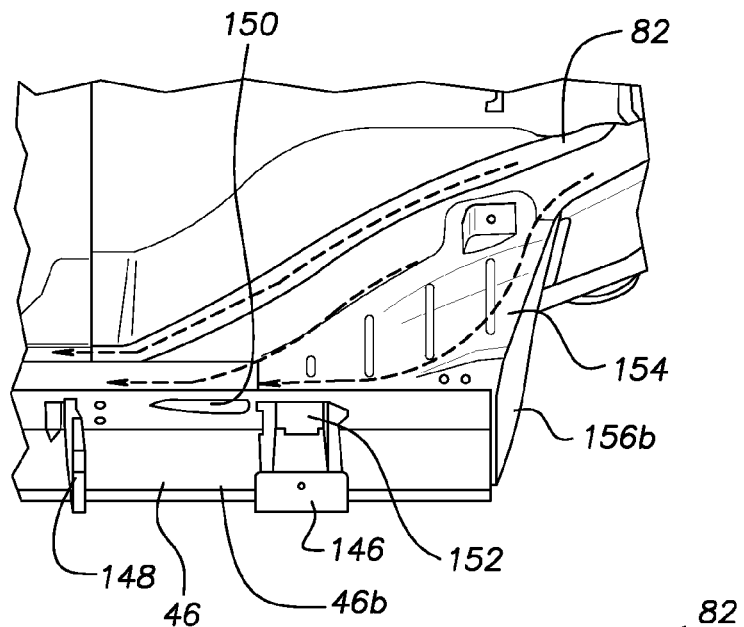
FIG. 18 is a top perspective view of the frame joint of FIG. 16.
Figure 19:
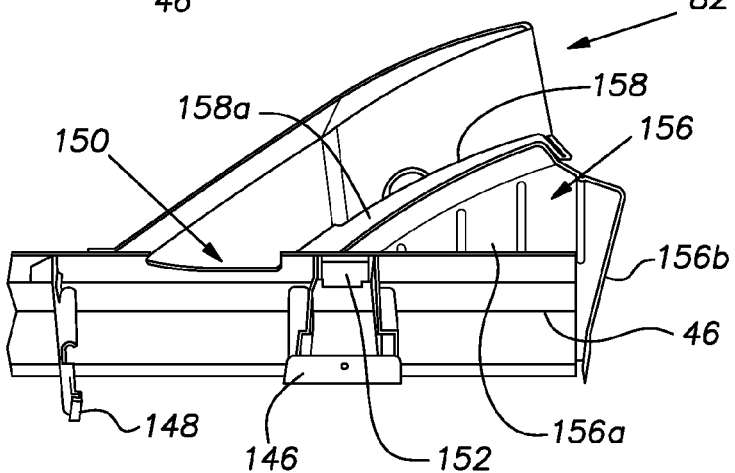
FIG. 19 is a sectional view of the frame joint of FIG. 16.
Figure 20:
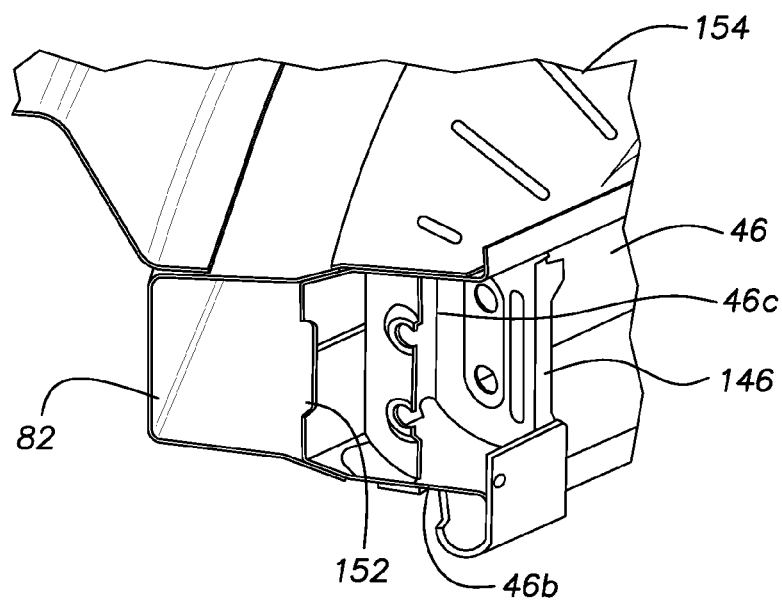
FIG. 20 is a side sectional view of the frame joint of FIG. 16.

FIGS. 5-8 AND 16-20 particularly show a side sill frame joint wherein the side sill member 46 connects to either the front or rear frame assemblies 58 or 64. As shown, the side member 66 or 82 of the front or rear frame assembly 58 or 64, both of which correspond to the side sill member 46, is angularly oriented relative to the side sill member 46 and connected to the side sill member 46 to transfer load forces thereto. In these joints, the side member 66 or 82 has an upper wall overlapping an upper wall 46a of the side sill member 46 along a region where the side member mates with the side sill member 46 and lower wall overlapping a lower wall 46b of the side sill member 46 along the same region. FIGS. 5-8 particularly show a frame joint between the side sill member 46 and the front frame side member 66 (specifically to the outer arm 70 thereof) and FIGS. 16-20 particularly show a frame joint between the side sill member 46 and the rear frame side member 82. FIGS. 14-15 particularly show a frame joint between the side sill member 46 and the cross member 52, which is generally the same as the frame joint between the side sill member 46 and the cross member 54.

With reference now specifically to FIGS. 5-8, the frame joint between the first side sill member 46 and the front frame side member 66 will now be described. The frame joint includes an upper wall 66a of the first front frame side member 66, and particularly of the first outer arm 70, overlapping the upper wall 46a of the first side sill member 46 along a region 120 where the side member 66 mates with the side sill member 46. The illustrated frame joint also includes a lower wall 66b of the side member 66, and particularly of the first outer arm 70, overlapping the lower wall 46b of the side sill member 46 along the same region 120. The overlapping portions of the walls 66a, 66b can be formed as flanges or flanged portions if desired. Moreover, these overlaps at the region 120 can be suitably employed for a welded connection between the side member 66 and the side sill member 46. In addition, this arrangement allows the mating between the side sill member 46 and the side member 66 along a full height dimension of both of these components with substantially zero offset between the mated components.

As already discussed, the side member 66 is angularly oriented relative to the side sill member 46. In this regard, the side member 66, and particularly the first outer arm 70 thereof, also includes a side wall 66c integrally formed with the upper wall 66a and the lower wall 66b. Like the side member 66, the side wall 66c is angularly oriented relative to the side sill member 46 and includes a flange 122 overlapping a side wall 46c of the side sill member 46 that is formed integrally with the upper and lower walls 46a, 46b of the side sill member 46. The overlapping flange 122 can also be suitably employed for a further welded connection between the side member 66 and the side sill member 46. As shown, the walls 66a-c extend continuously beyond a forward terminal end 124 of the side sill member 46.

Figure 7:
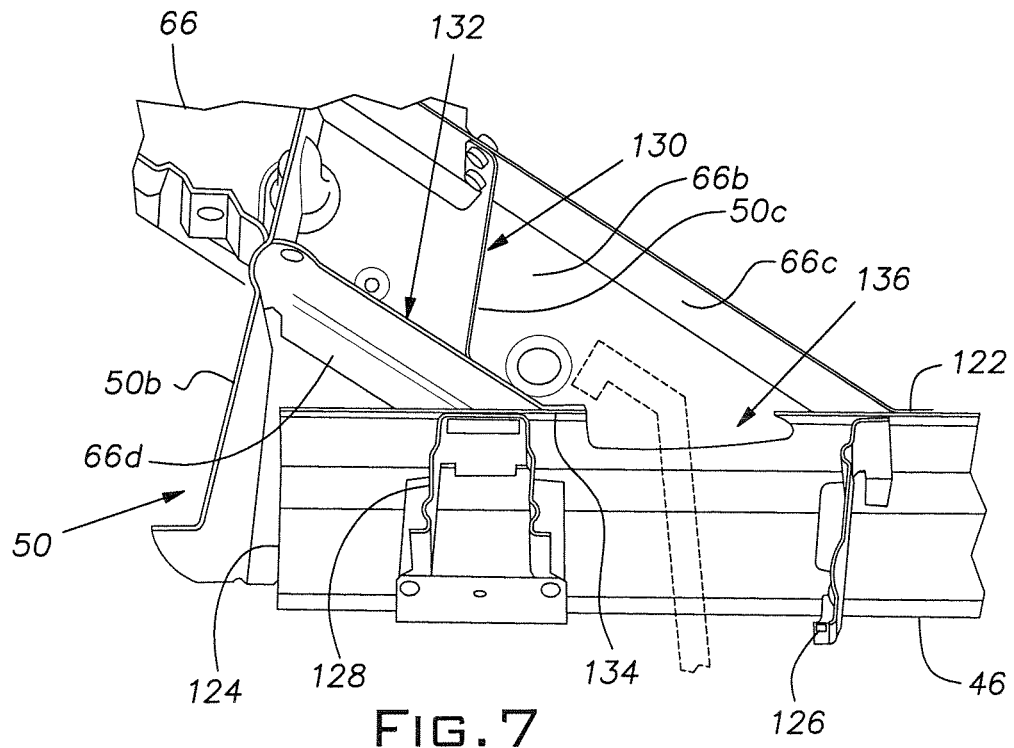
FIG. 7 is a sectional view of the frame joint of FIG. 5.
Figure 8:
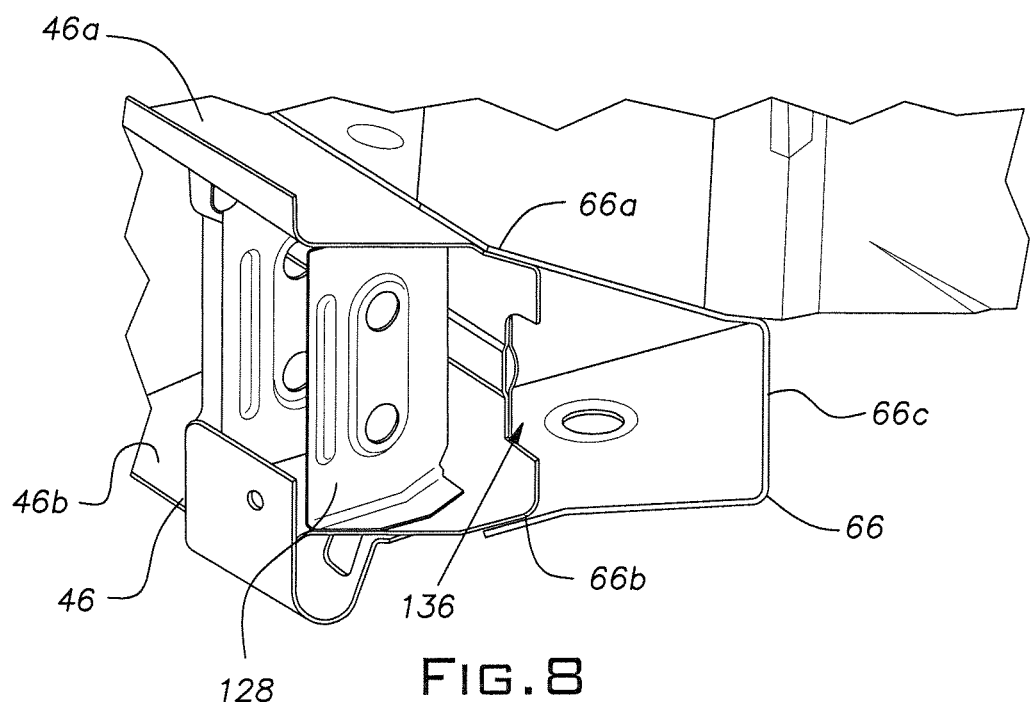
FIG. 8 is a side sectional view of the frame joint of FIG. 5.

As shown in FIG. 7, the side sill member 46 can include a bulkhead 126 orthogonally oriented relative to a longitudinal length of the side sill member 46. The bulkhead 126 can be located at about a location where the flange 124 overlaps the side wall 46c of the side sill member 46 (e.g., slightly forward of such location). The side sill member 46 can include another bulkhead 128 that is also orthogonally oriented relative to the longitudinal length of the side sill member. In the illustrated embodiment, the bulkhead 128 is U-shaped (i.e., includes two orthogonally extending walls) and is received forward of the bulkhead 126.

The first cross member 50 intersects the side member 66, and particularly the outer arm 70 thereof, adjacent the region 120 and further forms the illustrated joint with the side sill member 46 in the illustrated embodiment as the cross member 50 is secured directly to the side sill member 46. As shown, the cross member 50 has a lower wall 50a that overlaps the lower wall 46b of the side sill member 46 at a location forward of the region 120. More specifically, the lower wall 50a includes a flange 130 that overlaps the lower wall 46b of the side sill member 46. In addition, the cross member 50 has first and second side walls 50b, 50c extending upwardly from the lower wall 50a to give the cross member 50 a U-shaped profile. The first side wall 50b extends from the side sill member 46 continuously through the side frame member 66. A portion of the second side wall 50c is formed from a separate reinforcement member 130 received within the member 66 and extending from the side wall 66c toward the side sill member 46.

Opposite the side wall 66c, another side wall 66d is formed in part by a separate reinforcement member 132. The reinforcement member 132 and thus the side wall 66d extend continuously from the side sill member 46 to the first side wall 50b of the cross member 50. The reinforcement member 132 forms a secondary load path from the side member 66 to sill member 46, whereas the upper wall 66a, the lower wall 66b and the integrally formed side wall 66c form primary load paths from the side member 66 to the side sill member 46. The reinforcement member 132 can include a flange 134 that overlaps the side wall 46c of the side sill member 46. The bulkhead 128 can be located slightly forwardly adjacent a location where the flange 134 overlaps the side wall 46c of the side sill member 46.

The side wall 46c of the side sill member 46 defines an opening 136 that registers with an open end of the outer arm 70 of the side member 66 and through which access to the interior of the outer arm 70 may be gained to facilitate welding attachment of the stiffening member 132 to the side sill member 46, such as with a welding arm, shown in phantom in FIG. 7.

Figure 5:
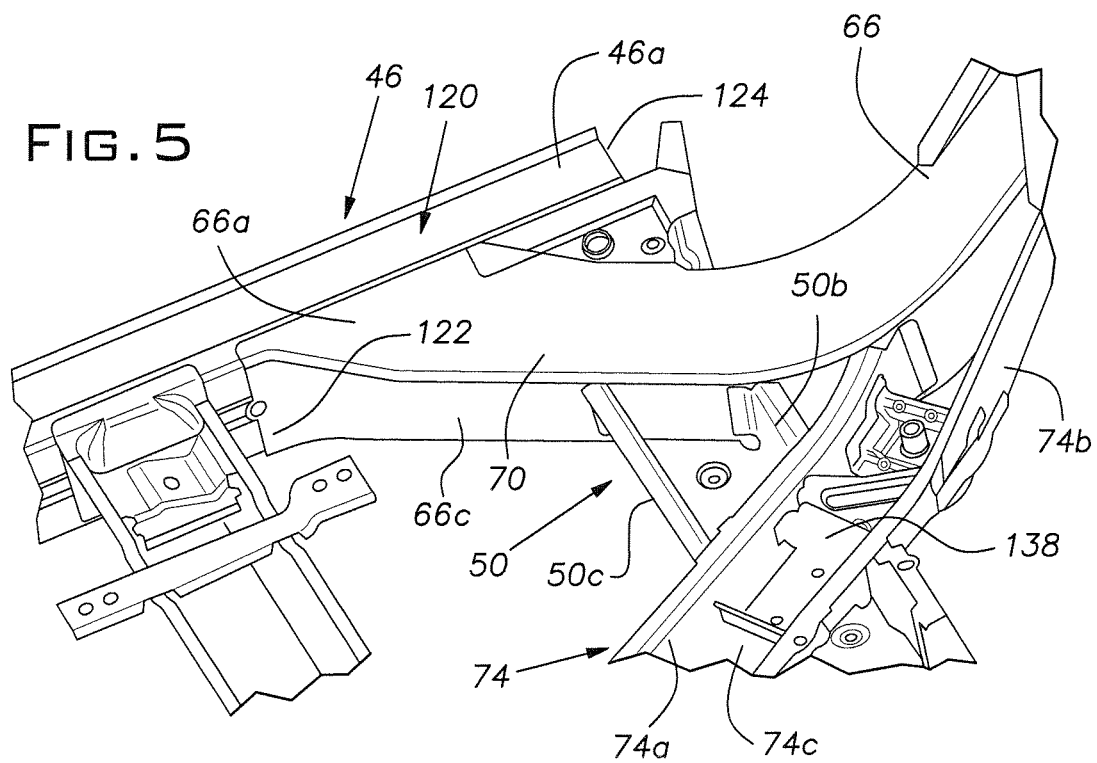
FIG. 5 is a perspective view of a frame joint between a front frame side member and a side sill member.
Figure 6:
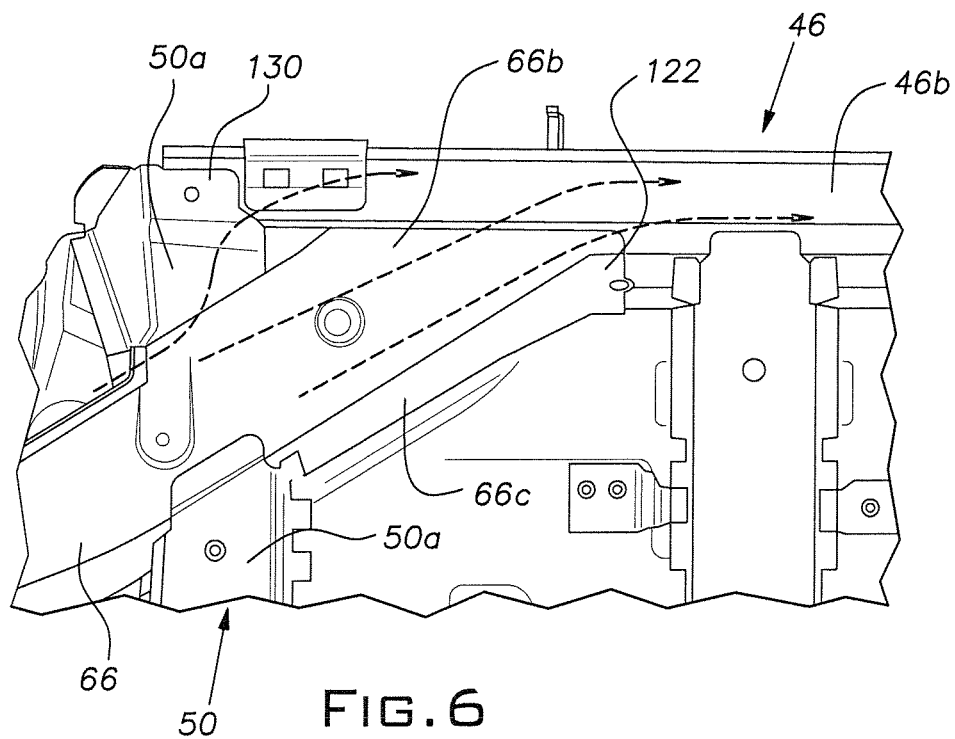
FIG. 6 is a bottom plan view of the frame joint of FIG. 5.

With reference to FIG. 5, a bridge member or bulkhead 138 is disposed within the inner arm 74 and serves to operatively link or interconnect the cross member 50 across the inner arm 74. The bridge member or bulkhead 138, which can be a U-shaped member having a pair of side walls and a bottom wall, is disposed within the open interior of the inner arm 74, extends between the inner arm outer wall 74a and inner wall 74b, and serves to communicate loads laterally between the inner and outer walls. Flanges at each end of the bridge member side walls are affixed to the inner and outer walls 74a, 74b of the inner arm 74, while the bridge member bottom wall is affixed to the inner arm bottom wall 74c.

With reference now specifically to FIGS. 16-20, the frame joint between the side sill member 46 and the rear frame side member 82 will now be described. This joint connects the rear frame assembly 58 to the floor frame assembly 42. The illustrated frame joint includes an upper wall 82a of the first rear frame side member 82 overlapping the upper wall 46a of the side sill member 46 along a region 140 where the rear frame side member 82 mates with the side sill member 46. A forward end of the side member 82 is laterally open and rests against the side sill member 46. The frame joint also includes a lower wall 82b of the rear frame side member 82 overlapping the lower wall 46b of the side sill member 46 along the same region 140. The overlapping portions of the walls 82a, 82b can be formed as flanges or flanged portions if desired. Moreover, these overlaps at the region 140 can be suitably employed for a welded connection between the side member 82 and the side sill member 46. In addition, this arrangement allows the mating between the side sill member 46 and the side member 82 along a full height dimension of both of these components with substantially zero offset between the mated components.

As shown, the side member 82 is angularly oriented relative to the side sill member 46. The side member 82 can also include a side wall 82c integrally formed with the upper wall 82a and the lower wall 82b. Like the side member 82, the side wall 82c is angularly oriented relative to the side sill member 46. The side wall 82c can also include a flange 142 overlapping the side wall 46c of the side sill member 46. The overlapping flange 142 can also be suitably employed for a further welded connection between the side member 82 and the side sill member 46. The walls 82a-c of the side member 82 extend continuously beyond a rearward terminal end 144 of the side sill member 46 in the illustrated embodiment.

The side sill member 46 can include bulkheads 146, 148 both orthogonally oriented relative to the longitudinal length of the side sill member 46. The bulkhead 148 can be located forwardly adjacent about a location where the flange 142 overlaps the side wall 46c of the side sill member 46. The bulkheads 146, 148 can be positioned along the side sill member 46 at locations about where the side frame member 82 connects to the side sill member 46. In particular, the bulkheads 146, 148 can be positioned at either end of the region 140 or slightly spaced apart from ends of the region 140 as is shown in the illustrated embodiment.

In addition, this joint can further include an upper reinforcing or gusset member 154 overlapping the upper wall 82a of the side member 82 and the upper wall 46a of the side sill member 46. A lower or underside reinforcing member 156 can overlap the lower wall 46b of the side sill member 46 and can be secured to the side member 82 as will be described below. In the illustrated embodiment, the reinforcing member 156 includes a first section 156a that overlaps the lower side 46c of the side sill member 46 and a second section 156b that is oriented approximately orthogonally relative to the first section 156a and relative to a longitudinal length of the side sill member 46. By this arrangement, the second section 156b can close an otherwise open rearward end of the side sill member 46. A side member reinforcing member 158 can form a second side wall of the side member 82 spaced apart from the other side wall 82c that extends from the upper surface 82a to the lower surface 82b. The member 158 can include an orthogonally extending flange 158a to which the second section 156b of the underside reinforcing member 156 is attached to connect the member 156 to the side member 82.

In the illustrated embodiment, the reinforcing members 154, 156, 158 can be disposed in the otherwise open space between a rear end of the side sill member 46 and the side member 82, and can serve to integrate the side member 82 and the side sill member 46 along a significant length, and thereby assists in transferring loads between the floor frame assembly 42 and the rear frame assembly 58. By this arrangement, rear impact loads can be transferred through the side member 82 to the side sill member 46 and also through the reinforcement members 154, 156, 158 so as to efficiently and effectively distribute loads between the rear frame assembly 58 and the floor frame assembly 42.

The side sill member 46 can define an opening 150 aligned with a forward end of the side member 82 and through which welding implements can be inserted into the interior of the side member 82 to facilitate welded attachment of the side sill member 46 to the side member 82. The side wall 46c can also define another opening 152 through which access to the underside of the reinforcement member 146 can be gained to facilitate welding attachment thereof to the side sill member 46.

With reference now specifically to FIGS. 14-15, the frame joint between the first side sill member 46 and the cross member 54 will now be described, though it should be appreciated that this joint could be used between any of the cross members 50-56. The illustrated frame joint includes an upper wall 54b of the cross member 54 overlapping the upper wall 46a of the side sill member 46 along a region 160 where the cross member 54 mates with the side sill member 46. The illustrated frame joint also includes a lower wall 54a of the cross member 54 overlapping the lower wall 46b of the side sill member 46 along the same region 160. These overlaps at the region 140 can be suitably employed for a welded connection between the cross member 54 and the side sill member 46. In addition, this arrangement allows the mating between the side sill member 46 and the cross member 54 along a full height dimension of both of these components with substantially zero offset between the mated components.

In the illustrated embodiment, the cross member 54 includes a first stamped member forming the lower wall 54a with a flange 162 that overlaps the lower wall 46b of the side sill member 46 and a pair of spaced apart upwardly extending side walls 54c, 54d each with flanges (only flange 164 shown) that overlap onto the side wall 46c. The cross member 54 also includes a second stamped member 166 forming the upper wall 54b. The second stamped member 166 includes a flange 168 that overlaps the upper wall 46a. All these overlaps by the flanges facilitate a welded connection between the cross member 54 and the side sill member 46. In addition, the side walls 54c, 54d include flanges 170, 172 for supporting a floor panel 174 of the floor frame assembly 42 as shown in FIG. 15. The floor panel 174 is also supported by the second stamped member 166.

By using the second stamped member 166, which can also be referred to as an insert, enhanced structural connectivity is provided to the joint between the cross member 54 and the side sill member 46—more than could be provided by the floor panel 174 alone. This can improve stiffness of the joint as well as efficient load transfer between the parts comprising the joint. Further, the connections between the insert 136, the cross member 54, and the side sill member 46 at the top and bottom of the side sill member 46 allow for smooth load paths, which efficiently transfer forces from the side sill into the cross member and floor panel.

Figure 9:
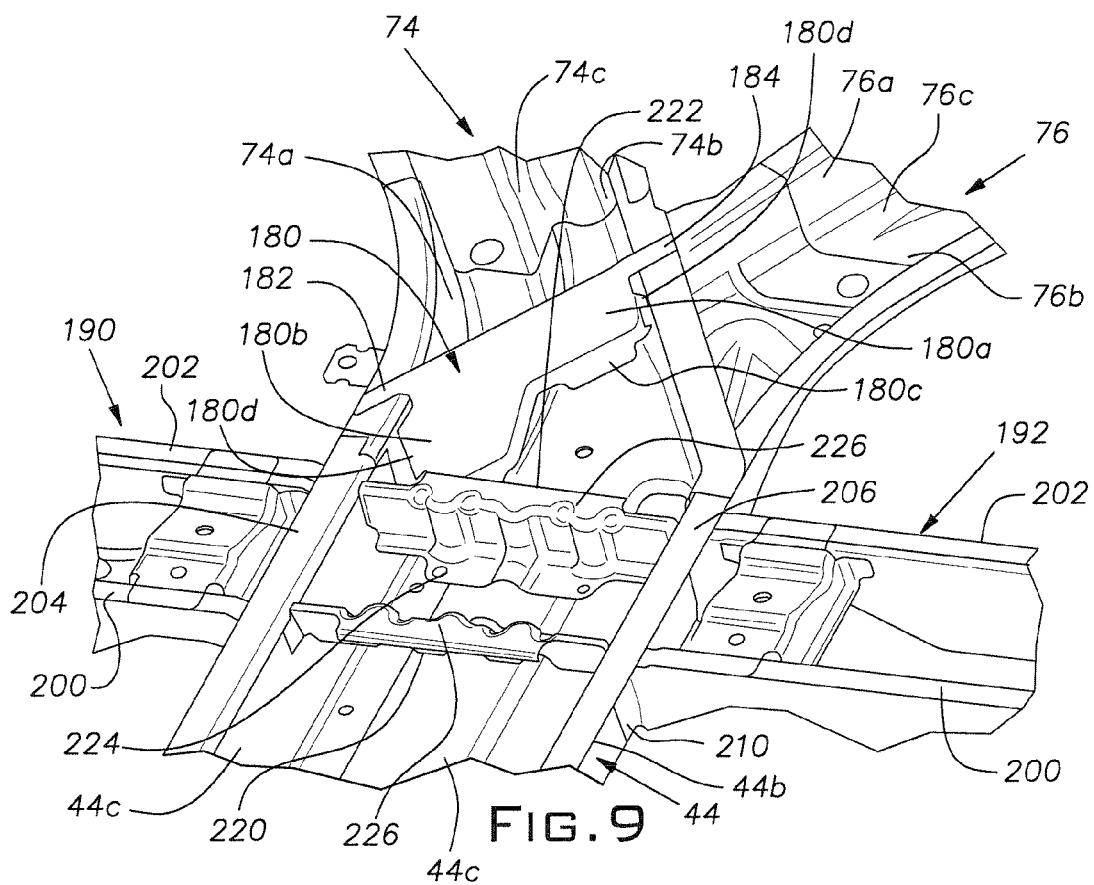
FIG. 9 is a perspective view of a frame joint between first and second inner members of a front frame assembly and a center frame member of a floor frame assembly.
Figure 10:
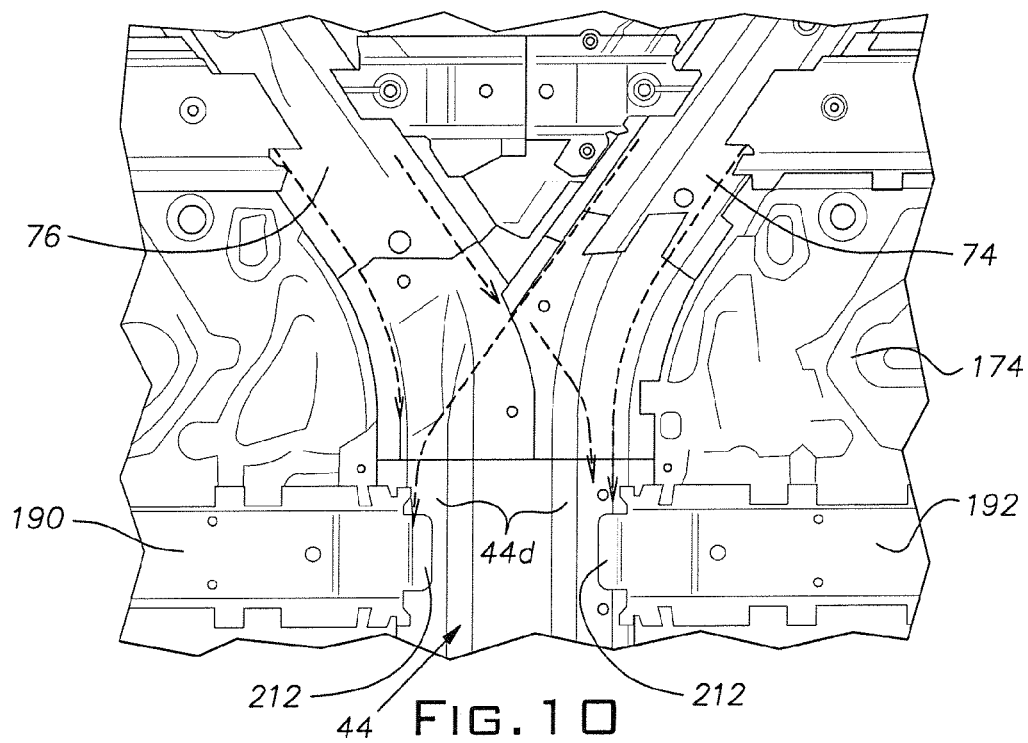
FIG. 10 is a bottom plan view of the frame joint of FIG. 9.
Figure 11:
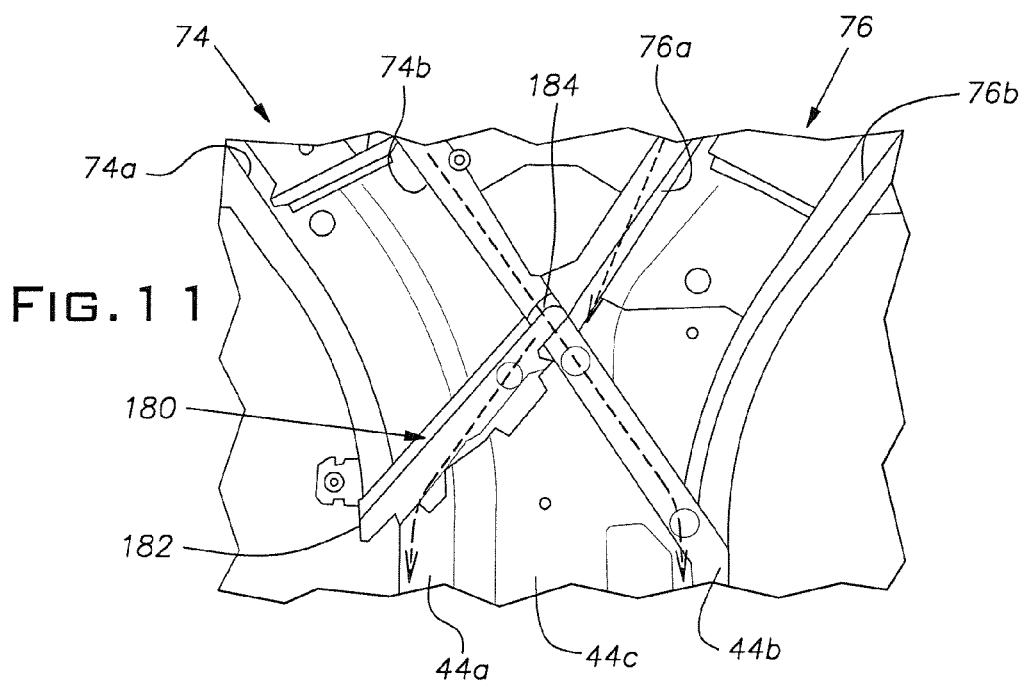
FIG. 11 is a top plan view of the frame joint of FIG. 9.
Figure 12:
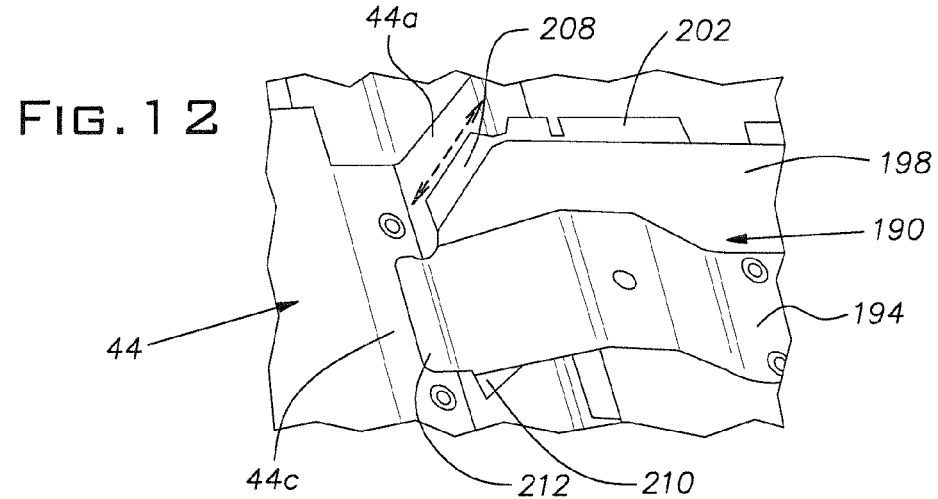
FIG. 12 is a perspective view of a frame joint between a cross member and a center frame member, both of a floor frame assembly.
Figure 13:
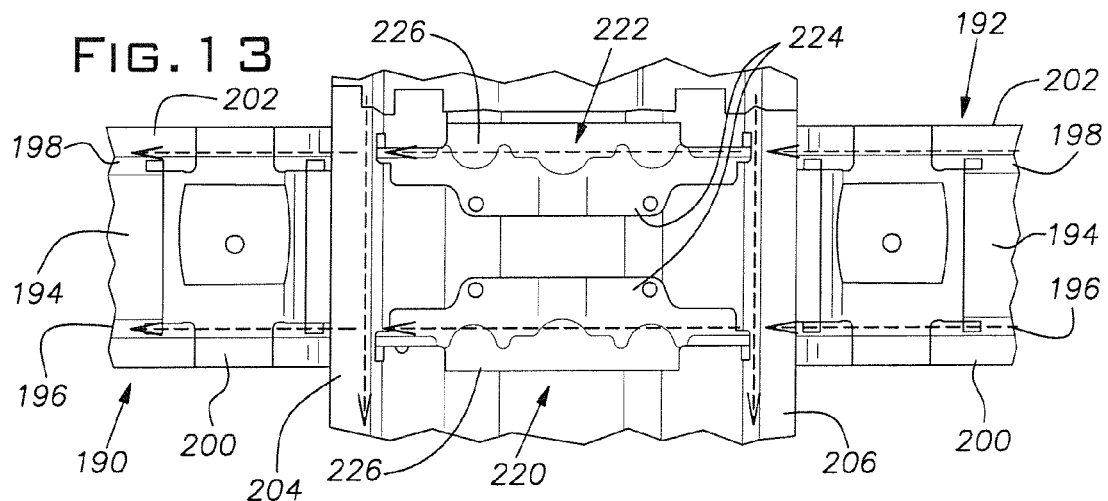
FIG. 13 is a top plan view of the frame joint of FIG. 12.
Figure 21:
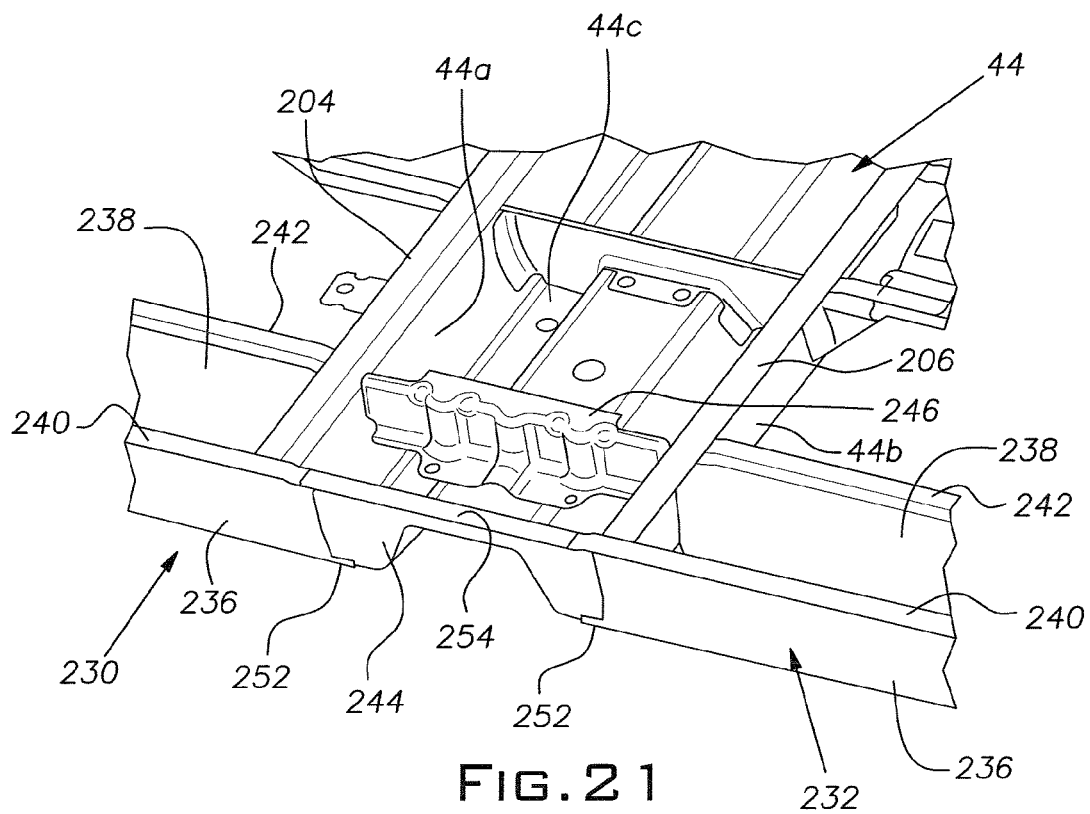
FIG. 21 is a perspective view of a frame joint between a cross member and a center frame member, both of a floor frame assembly.
Figure 22:
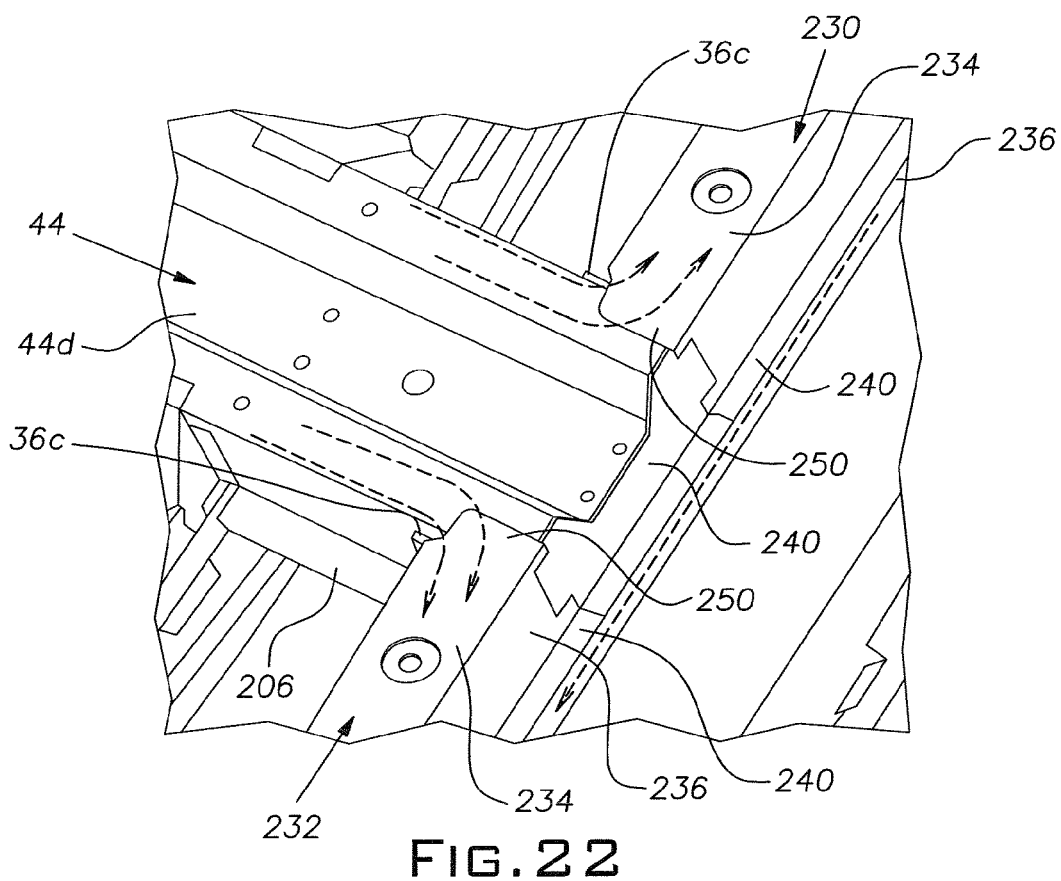
FIG. 22 is a bottom perspective view of a frame joint of FIG. 21.

Exemplary vehicle center frame member joints are shown in FIGS. 9-13 and 21-22. As will be described below, each of these joints includes the center frame member 44 and at least one connecting frame member (e.g., the inner arms 74, 76 of the front frame assembly 62, the cross-members 50-56, etc.). FIG. 9-11 particularly show a center frame member joint wherein the center frame member 44 connects to the inner arms 74, 76 of the front frame assembly 62. FIGS. 12-13 and 21-22 show joints between the center frame member 44 and the cross-members 50-56. In each of these joints, a cross-member or segments of the cross-member are connected to the center frame member 44 and extend therefrom laterally toward an associated one of the side sill members 46, 48. Further, the cross-member or cross-member segment has, in these joints, a lower wall that overlaps the lower wall 44c of the center frame member 44 and an upper wall that overlaps an upper wall of the center frame member as will be described in more detail below. All overlapping relations between the frame components can serve as suitable weld locations for welding mating frame components to one another, though it is to be appreciated that other connection methods could be used. FIGS. 12 and 13 particularly show a joint or joints between one of the cross-members 50-54 or segments thereof and the center frame member 44. FIG. 21-22 show a pair of joints between the center frame member 44 and the rearward-most one of the cross-members (i.e. cross member 56) or segments thereof.

With reference now specifically to FIG. 9-11, a frame joint between the first and second inner members 74, 76 and the center frame member 44 will now be described. The frame joint includes the first and second spaced apart side walls 44a, 44b and the center wall 44c of the center frame member 44, the walls 44a, 44b being integrally formed with and extending from the center wall 44c. The joint also includes first and second spaced apart side walls 74a, 74b of the first inner arm member 74 integrally formed with and extending from a center wall 74c of the first inner member 74. The first side wall 74a of the first inner member 74 is contiguous with and blends into the first side wall 44a of the center frame member 44 and the second side wall 74b of the first inner member 74 is contiguous with and blends into the second side wall 44b of the center frame member 44.

In addition, first and second spaced apart side walls 76a, 76b of the second inner member 76 are integrally formed with and extend from a center wall 76c of the second inner member 76. The first side wall 76a of the second inner member 76 terminates at the second side wall 74b of the first inner member 74 and the second side wall 76b of the second inner member 76 is contiguous and blends into the second side wall 44b of the center frame member 44 thereby providing a primary load path from the first inner member 74 to the center frame member 44 and a secondary load path from the second inner member 76 to the center frame member 44.

A reinforcing wall member 180 extends from the second side wall 74b of the first inner member 74 toward the first side wall 44a of the center frame member 44 to transfer loads from the first side wall 76a of the second inner member 76 to the first side wall 44a of the center frame member 44. As shown in the illustrated embodiment, the reinforcing wall member 180 has a first end 180a connected to the second side wall 74b of the first inner member 74 at a location about where the first side wall 76a of the second inner member 76 terminates, and has a second end 180b connected to one of the first side wall 74a of the first inner member 74 and/or the first side wall 44a of the center frame member 44. Specifically, in the illustrated embodiment, the second end 180b is shown connected to the first side wall 74a adjacent the location about where the first side wall 74a engages and connects with the first side wall 44a of the center frame member 44. The reinforcing wall member 180 can have a longitudinal length generally aligned with a longitudinally extending portion of the first side wall 76a of the second inner member 76 (i.e., a portion adjacent the second side wall 74b of the first inner member 74) to define a load path from the first side wall 76a of the second inner member 76 through the reinforcing wall member 180 to the first side wall 44a of the center frame member 44.

As best shown in FIG. 10, the center wall 76c of the second inner member 76 overlaps the center wall 74c of the first inner member 74, which can be suitably used for welding these components to one another. As shown, the side walls of both the center frame member 44 and the first and second inner members 74, 76 can include flanges at distal ends thereof that define a surface to which the floor panel 174 can be secured against (e.g., via welding). The joint formed by the center frame member 44 and the side members 74, 76 is generally a Y-shaped joint in the illustrated embodiment. In addition to the respective side walls of the side members 74, 76 generally overlapping and/or merging with the side walls 44a, 44b of the center frame member 44, respective raised portions of the side members 74, 76 are generally aligned with, and generally serve as an extension of, raised center section 44d (FIG. 10).

The reinforcing wall member 180 is generally formed as an upstanding wall having its first end 180a formed as a shallow or short portion that rests upon the raised portion of the first inner arm bottom wall 74c, and the second end 180a formed as a relatively taller or deeper portion that rests upon the sunken portion of the first inner arm bottom wall 74c. Each of the shallower and deeper portions have protruding base flanges 180c that rest upon, and can be welded to, the bottom wall 74c of the inner arm 74. The shallower and deeper portions formed by the ends 180a, 180b also include side flanges 180d that rest upon, and are welded to, the side walls 74a, 74b of the inner arm 74. The reinforcing wall member 180 can also include flange portions 182, 184 that extend outwardly to lie along, and be connected to, respective flanges provided by the first and second side walls 74a, 74b of the inner member 74.

By including the reinforcing wall member 180, the Y-shaped center joint has a generally X-shaped load path (illustrated by dashed lines in FIGS. 10 and 11) whereby longitudinal loads can be effectively transferred from the front frame assembly 62 to the floor frame assembly 42 and, more specifically, to the center frame member 44 and to the cross-members 50-56 secured thereto. For example, should a longitudinally-directed compressive load be applied to the second inner arm 76, such load can be effectively distributed to the first and second walls 44a, 44b of the center frame member 44. Likewise, should a longitudinally-directed compressive load be applied to the first inner arm 74, such load can be effectively distributed to the inner and outer side walls 44a, 44b of the center frame member 44. The flanges of the inner arm side walls 74a, 74b and 76a, 76b, together with the flanges 204, 206 of the side walls 44a, 44b, can provide a support surface for floor panel 174, which can be welded thereto. Accordingly, the floor panel 174 can be integrally secured to and over the inner arms 74, 76, the cross-members 50-56, and the center frame member 44. This can assist in managing stress flow from the front frame assembly 62, through the Y-joint, and into the floor frame assembly 42. As such, front crash loading can be efficiently and effectively transferred from the front frame assembly 62 to the floor frame assembly 42. Notably, a full height of the inner arms 74, 76 is mated to a full height of the center frame member 44, which can advantageously increase or maximize stiffness of the joint and enhance load transfer characteristics between the frame components 44, 74, 76.

With additional reference to FIGS. 12 and 13, a frame joint between at least one of the cross-members 50-56 and center frame member 44 will now be described. In particular, the frame joint between the cross member 52 and the center frame member 44 will be described in FIG. 9-13. With brief reference to FIG. 1, the cross-member 52 includes a first segment 190 spanning between the first side sill member 46 and the center frame member 44 and a second segment 192 spanning between the second, opposite side sill member 48 and the center frame member 44. As best shown in FIG. 12 concerning the first segment 190, a lower wall (e.g., lower wall 192a) of each of the first and second segments 190, 192 overlaps the lower wall 44c of the center frame member 44 and an upper wall of each of the first and second segments 190, 192 overlaps an upper wall of the center frame member 44 as will be described in more detail herein.

With continued reference to FIG. 12, each of the first and second segments 190, 192 includes a respective lower wall 194, a pair of spaced apart side walls 196, 198 extending upwardly from the lower wall 194, and the upper wall formed by at least one flange (e.g., flanges 200, 202 on the segments 190 and 192) extending from distal ends of the side walls 196, 198. As already described herein, the center frame member 44 includes the center or lower wall 44c, the pair of spaced apart side walls 44a, 44b extending upwardly from the lower wall 44c and an upper wall, which can be formed by at least one flange (e.g., flanges 204, 206 in the illustrated embodiment) that extend from respective distal ends of the pair of spaced apart side walls 44b, 44c. As shown, the at least one flange (e.g., flanges 200 and 202) of the first and second segments 190, 192 overlaps the at least one flange (e.g., flanges 204, 206) of the center frame member 44 and thereby provide a support surface for the floor panel 174.

In addition, each of the pair of spaced apart side walls 196, 198 of the first and second segments 190, 192 includes respective flanges 208, 210 overlapping the first and second side walls 44a, 44b of the center frame member 44. Further, the lower walls 194 of each of the segments 190, 192 can include a flange 212 (FIGS. 10 and 12) that overlaps the center wall 44c of the center frame member 44. As with the other joints described herein, the overlapping flanges in this joint can be suitably employed for a welded connection between the segments 190, 192 and the center frame member 44. In addition, as indicated by the dashed line in FIG. 12, this arrangement also allows the mating between the segments 190, 192 and the center frame member 44 along a full height dimension of all of these components with substantially zero offset between the segments 190, 192 and the center frame member 44. Attaching about the entire height of the center frame member 44 can advantageously increase or maximize stiffness of the joint and enhance efficient load transfer between the frame components.

The cross-member 52 comprised of the segments 190, 192 can further include at least one reinforcement member extending between adjacent ends of the first and second segments 190, 192 (i.e., the ends that are secured to the center frame member 44). This at least one reinforcement member can be received within the center frame member 44 between the first and second side walls 44a, 44b thereof. In the illustrated embodiment, this at least one reinforcement member includes a first reinforcement wall 220 extending between and aligned with first side walls 196 of the first and second segments 190, 192 and a second reinforcement wall 222 extending between and aligned with the second side walls 198 of the first and second segments 190, 192. The first and second reinforcement walls 220, 222 can include respective lower flanges 224 that extend toward one another and are disposed upon, and fixed to, an upwardly facing, lengthwise extending surface of the center frame member 44. The first and second reinforcement walls 220, 222 can also have respective upper flanges 226 that extend away from one another. The upper flanges 226 can be in contact with, and welded to, the floor panel 174. The floor panel 174, which is disposed over the union of the center frame member 44 and the first and second cross-member segments 190, 192, can serve as an integral part of the overall joint, and can help to manage the stress flow from one of the cross-member segments 190 or 192 through the center frame member 44 and the reinforcement walls 220, 222, and into the other of the segments 190, 192.

As shown in FIG. 13 and indicated by the dashed lines therein, the first reinforcement wall 220 defines a first load transfer path from the first side wall 196 of the first segment 190 to the first side wall 196 of the second segment 192 (or vice versa) and the second reinforcement wall 222 defines a second load transfer path from the second side wall 198 of the first segment 190 to the second side wall 198 of the second segment 192 (or vice versa). The side walls 44a, 44b of the center frame member 44 interrupt the first load path defined by the first reinforcement member 220 thereby defining this first load path as a secondary load path relative to the load paths defined by each of the pair of side walls 44a, 44b. Likewise, the pair of side walls 44a, 44b of the center frame member 44 interrupt the second load path defined by the second reinforcement member 22 thereby defining this second load path as another secondary load path relative to the load paths defined by each of the pair of side walls 44a, 44b.

Figure 23:
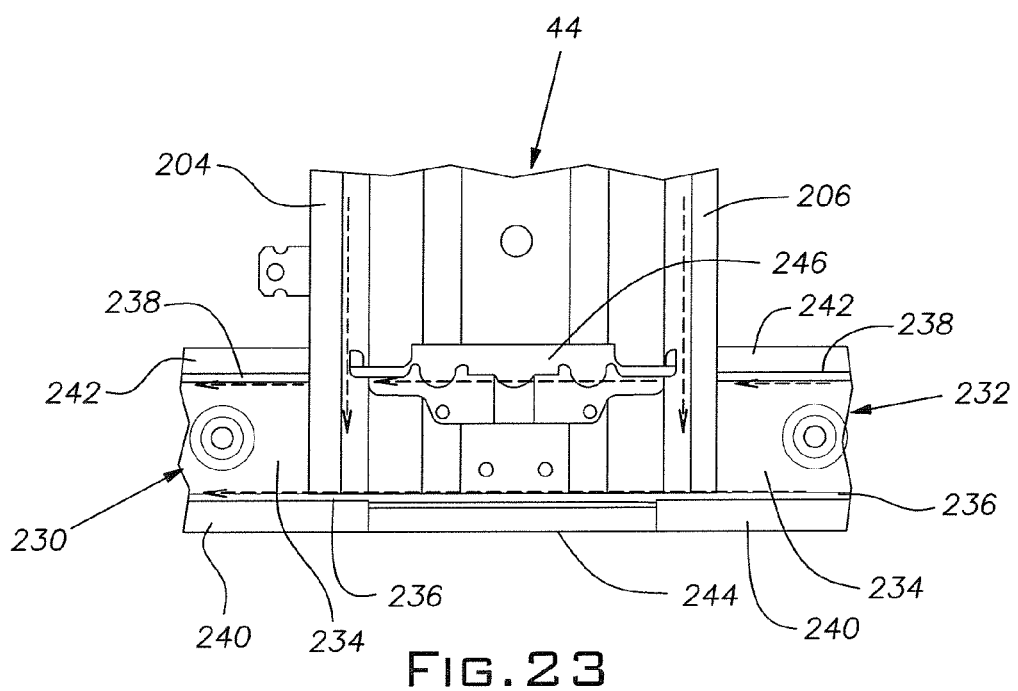
FIG. 23 is a top plan view of the frame joint of FIG. 21.

With reference now specifically to FIG. 21-23, the frame joint between the rearmost cross-member 56 and the center frame member 44 will now be described. Similar to the cross-member 52 described above, cross-member 56 includes a first segment 230 spanning between the first side sill member 46 and the center frame member 44 and a second segment standing between the second, opposite sill member 46 and the center frame member 44. As best shown in FIG. 22, the lower wall 234 of each of the first and second segments 230, 232 overlaps the lower wall 44c of the center frame member 44. In particular, the lower walls 234 of the first and second segments 230, 232 can include flanges to 250 that overlap the center frame member 44, particularly the center wall 44c thereof. In addition, as will be described in more detail below, an upper wall of each of the first and second segments 230, 232 overlaps an upper wall of the center frame member 44 (e.g., the upper wall formed by the flanges 204, 206).

As shown, each of the first and second segments 230, 232 includes the lower wall 234, a pair of spaced apart side walls 236, 238 extending upwardly from the lower wall 234 and the upper wall formed by at least one flange (e.g., flanges 240, 242) extending from distal ends of the side walls 236, 238. The at least one flange of the first and second segments 230, 232 (e.g., flange 242) overlaps the at least one flange (e.g., flanges 204, 206 of the center frame member 44) and thereby provide a further support surface for the floor panel 174. In the illustrated embodiment, the flanges 240 of the first and second segments 230, 232 do not overlap the flanges 204, 206 of the center frame member 44. Though not shown, the side walls 238 of the first and second segments can also include a respective flange (similar to flange 210 in FIG. 12) that overlaps a respective one of the side walls 44a, 44b of the center frame member 44. The overlaps of the segments 230, 232 onto the center frame member 44 can be suitably employed for a welded connection between the segments 230, 232 and the center frame member 44. In addition, this arrangement allows the meeting between the segments 230, 232 and the center frame member 44 to occur along a full height dimension of all of these components with substantially zero offset between mated components.

The cross-member 56 formed by the segments 230, 232 can additionally include at least one reinforcement member extending between adjacent ends of the first and second segments 230, 232 (i.e., the ends connected to the center frame member 44). This at least one reinforcement can be received within the center frame member 44 between its first and second side walls 44a, 44b. In particular, in the embodiment illustrated in FIG. 21-23, this at least one reinforcement member can include a first reinforcement wall or member 244 extending between and aligned with side walls 236 or the first and second segments 230, 232 and a second reinforcement wall or member 246 extending between and aligned with the side walls 238 of the first and second segments 230, 232.

In this arrangement, as best indicated in FIG. 23 by the illustrated arrows, the first reinforcement wall 244 defines a first load transfer path from the first side wall 236 of the first segment 230 to the first side wall 236 of the second segment 232 (and vice versa) and the second reinforcement wall 246 defines a second load transfer path from the second side wall 238 of the first segment 230 to the second side wall 238 of the second segment 232 (and vice versa). However, the side walls 44a, 44b of the center frame member 44 interrupt the load path defined by the reinforcement wall 246 thereby defining its load path as a secondary load path relative to the load paths defined by each of the side walls 44a, 44b of the center frame member. The reinforcement wall 244 provides an uninterrupted path between the walls 236 of the first and second segments 230, 232. In the illustrated embodiment, the second reinforcement wall 244 abuts each of the first and second segments 230, 232, particularly the walls 236 thereof, and extends continuously there between.

Flanges 252 of the walls 236 of the first and second segments 230, 232 extend over, and are secured to, the reinforcement wall 244, which extends across the otherwise open end of the center frame member 44. The reinforcement member 244 also includes an upper flange 254 which is contiguous with the flanges 240 of the first and second segments 230, 232. The reinforcement member 244 can serve to stiffen the rear end of the center frame member 44, while leaving an opening beneath through which a driveshaft, etc. can pass.

With reference to FIG. 24-27, the vehicle frame assemblies 30-36 are shown with further structural or frame components installed. For example, the doorframes 110 are shown installed on the sides of the vehicle frame assemblies 30-36. In addition, the top door rails 260 are installed and cooperate with the doorframes 110 to define door openings. A dividing wall 262 extends between the doorframe members 110, particularly between rear ends of the doorframe members 110 at about a location disposed between the floor frame assembly 42 (or 42') and the rear frame assembly 58 or 60. A rear top rail 264 is spaced vertically above the dividing wall 262 and also extends between the doorframe members 110 to define a rear window opening.

The rear frame assemblies 58 (FIGS. 24 and 25) and rear frame assemblies 60 (FIGS. 26 and 27) are also shown with additional frame components installed. In particular, in the rear frame assemblies 58 of FIGS. 24 and 25, upper rails 270, 272 having respective first longitudinal lengths extend from respective rear cab pillar or pillar areas 274 to a rear bed pillar 276, where the rear cab pillars 274 formed at respective intersections between the doorframe members 110 and the dividing wall 262. The upper rails 270, 272 are each respectively supported by support beams 278, 280 extending from the rear frame side members 82, 84 upward to the upper rails 270, 272, respectively. As will be described in more detail below, this arrangement provides multiple load paths to dissipate energy in the event of a rear-end collision and also provides flexibility in manufacturing, thereby reducing manufacturing costs.

Figure 26:
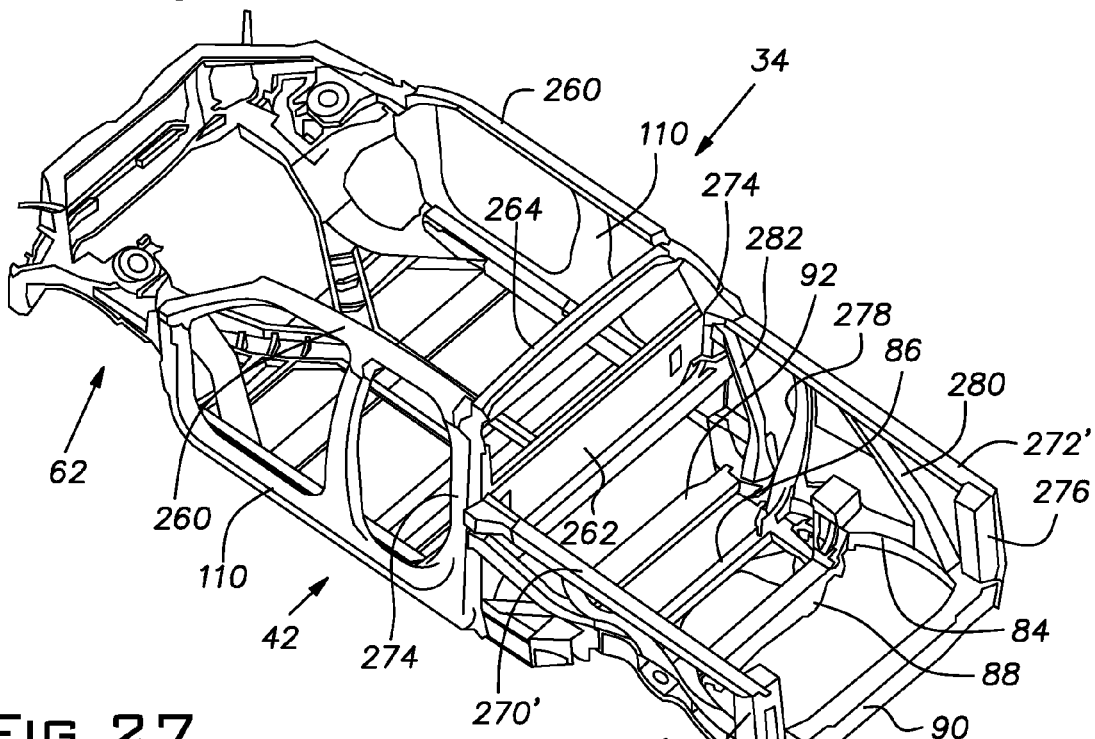
FIG. 26 is a perspective view of the vehicle frame of FIG. 3 shown with further frame components installed.
Figure 27:
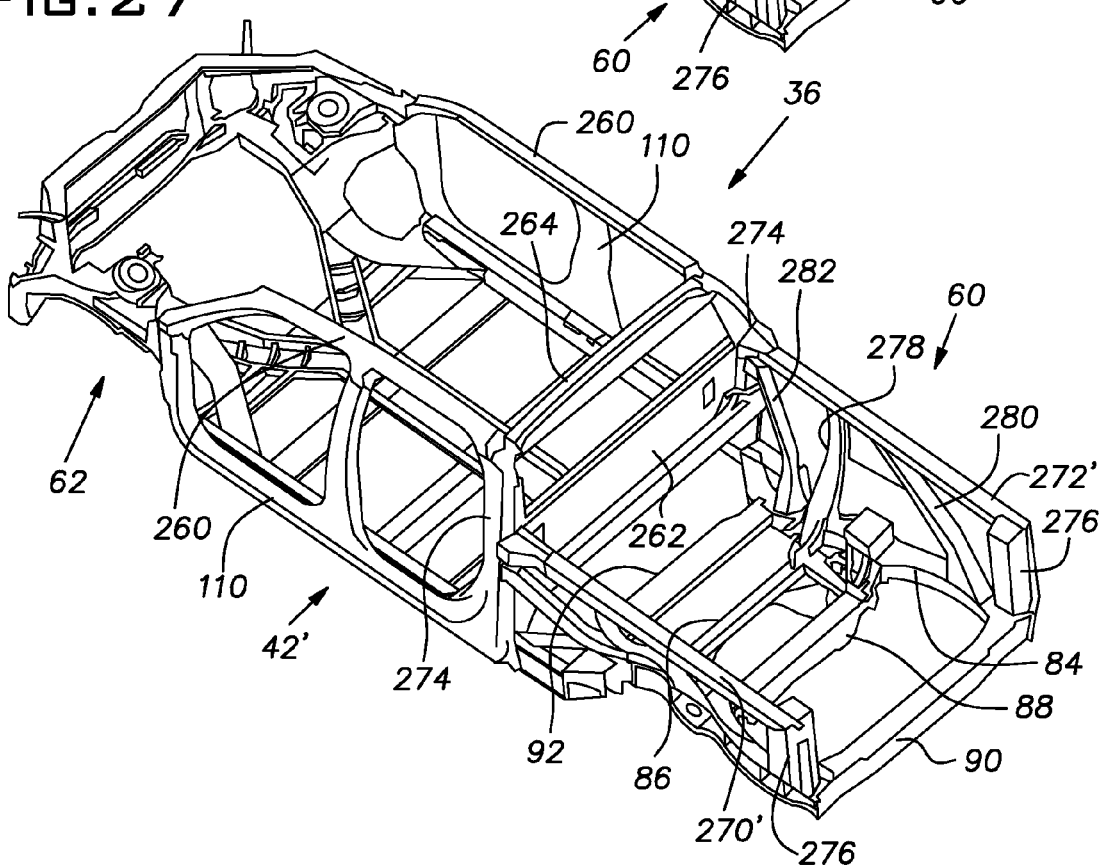
FIG. 27 is a perspective view of the vehicle frame of FIG. 4 shown with further frame components installed.

The rear frame assemblies 62 of FIGS. 26 and 27 can be similarly constructed, though frame rails 270' and 272' have respective second longitudinal lengths that are longer than the respective first longitudinal lengths of the frame rails 270, 272. Like the upper rails 270, 272, the upper rails 270' and 272' extend from respective rear cab pillar areas 274 to rear bed pillars 276 and are supported by support beams 278 and 280. In addition, a supplementary support beam 282 can also be provided to further support the relatively elongated upper rails 270' and 272'. The supplemental support beams 282 extend from respective rear frame side members 82 or 84 forward of the beams 278, 280 and extending toward the rear cab pillar area 274.

In the vehicle frame assemblies 30-36 illustrated in FIG. 24-27, one or more of the longitudinal frame members of the first and second rear frame assemblies 58, 60 can have a cross-sectional profile that remains constant along at least a longitudinal portion thereof allowing these one or more members to be cut at a first location along the longitudinal portion corresponding to the first longitudinal length when included in the first rear frame assembly 58 and at a second location along the longitudinal portion corresponding to the second longitudinal length when included in the second rear frame assembly. In the illustrated embodiment, these one or more longitudinal members include the upper bed rails 270, 272 and 270', 272'. As shown in these members, the longitudinal portion is an entire longitudinal extent of the longitudinal members, though this is not required. To facilitate such cutting at a first location or a second location, the longitudinal members (i.e., the upper rails) can be roll-formed.

Figure 24:
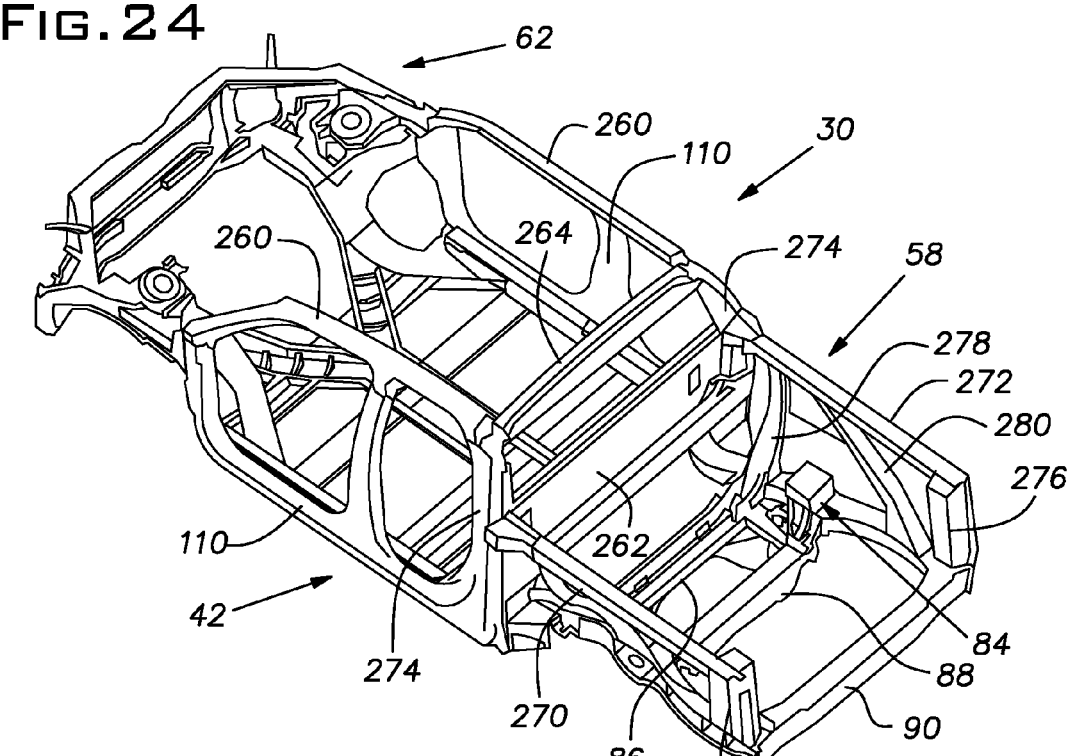
FIG. 24 is a perspective view of the vehicle frame of FIG. 1 shown with further frame components installed.
Figure 25:
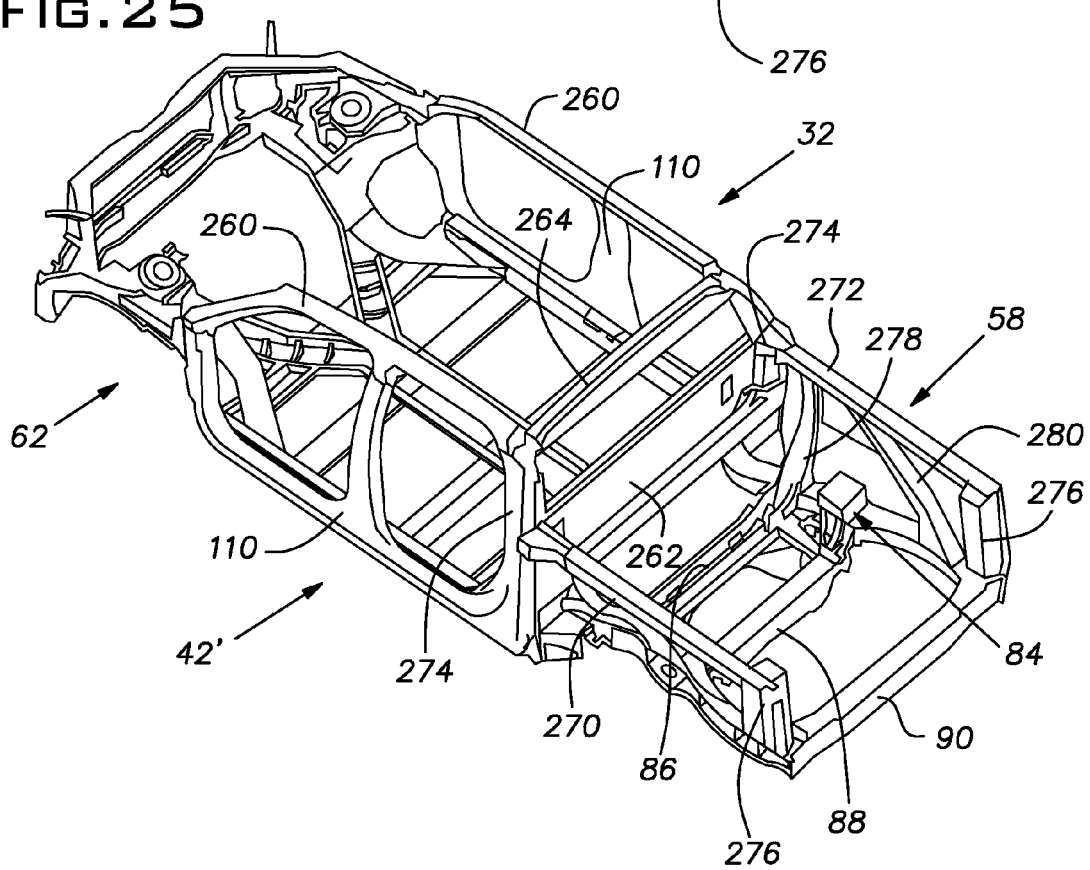
FIG. 25 is a perspective view of the vehicle frame of FIG. 2 shown with further frame components installed.

It is to be appreciated that the roll-formed upper bed rails 270, 272 and 270', 272', can be used in vehicle types where the floor frame assemblies are common with one another, such as the first vehicle type of FIG. 24 and the third vehicle type of FIG. 26. Alternatively, the roll-formed longitudinal frame components for the rear frame assemblies 58, 60 can be used with first and second vehicle floor frame assemblies that vary relative to one another, such as shown in FIGS. 26 and 27. As already discussed herein, the vehicle frame assemblies 30-36 can all be included as part of a unibody frame, thus the longitudinal members (e.g., the upper rails 270, 272 and 270', 272') can be comprised within a unibody frame.

By the foregoing, it is to be appreciated that a bed frame assembly for a vehicle is disclosed including at least one longitudinal frame member having a cross-sectional profile that remains constant along at least a longitudinal portion thereof (e.g., the upper bed rails 270, 272 and 270', 272'). This longitudinal portion can have a first portion length when installed on a first vehicle type having a first bed frame longitudinal length (e.g., the vehicle type depicted in FIG. 24) and a second portion length when installed on a second vehicle type having a second bed frame longitudinal length (e.g., the second vehicle type depicted in FIG. 27). The longitudinal portion that has a cross-sectional profile that remains constant can be the entire longitudinal extend of the longitudinal frame component. For example, the upper bed rails 270, 272 and 270', 272' each have a cross-sectional profile that remains constant along an entire longitudinal extent of these frame components. Moreover, the upper bed rails 270, 272 and 270', 272' extend along substantial portions, respectively, of the first bed frame longitudinal length and/or the second bed frame longitudinal length.

With brief reference to FIG. 31, a bed frame construction method for forming vehicle bed frames having varying longitudinal bed lengths will now be described. In 100, at least one first longitudinal frame component having a defined cross-section of a first longitudinal length is formed for a first vehicle type. In 102, the formed first longitudinal frame component is installed on a first bed frame assembly of the first vehicle type. The at least one first longitudinal frame component formed and installed in 100 and 102 can be the upper bed rails 270, 272. In 104, at least one second longitudinal frame component having the same defined cross-section is formed of a second longitudinal length for a second vehicle type. In 106, the formed second longitudinal component is installed on a second bed frame assembly of the second vehicle type. The at least one second longitudinal component can be the bed rails 270', 272'. Moreover, as already described herein, the steps of forming the bed rails 270, 272 and 270', 272', can include roll-forming these components.

Figure 28:
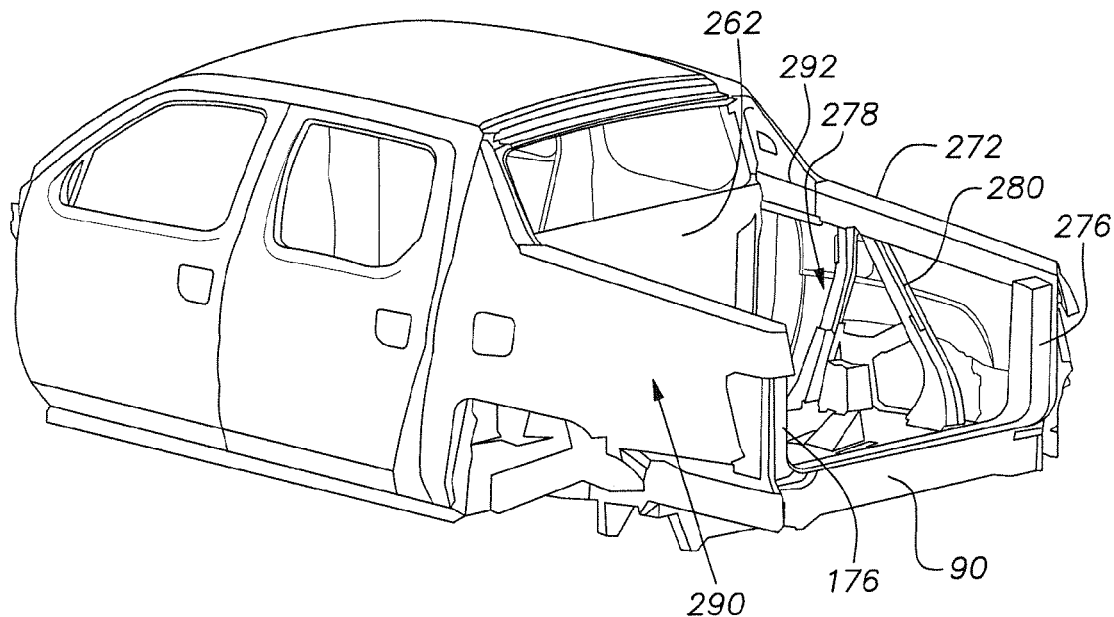
FIG. 28 is a partial perspective view of the vehicle frame of FIG. 24 shown with still further vehicle frame/body components installed.
Figure 29:
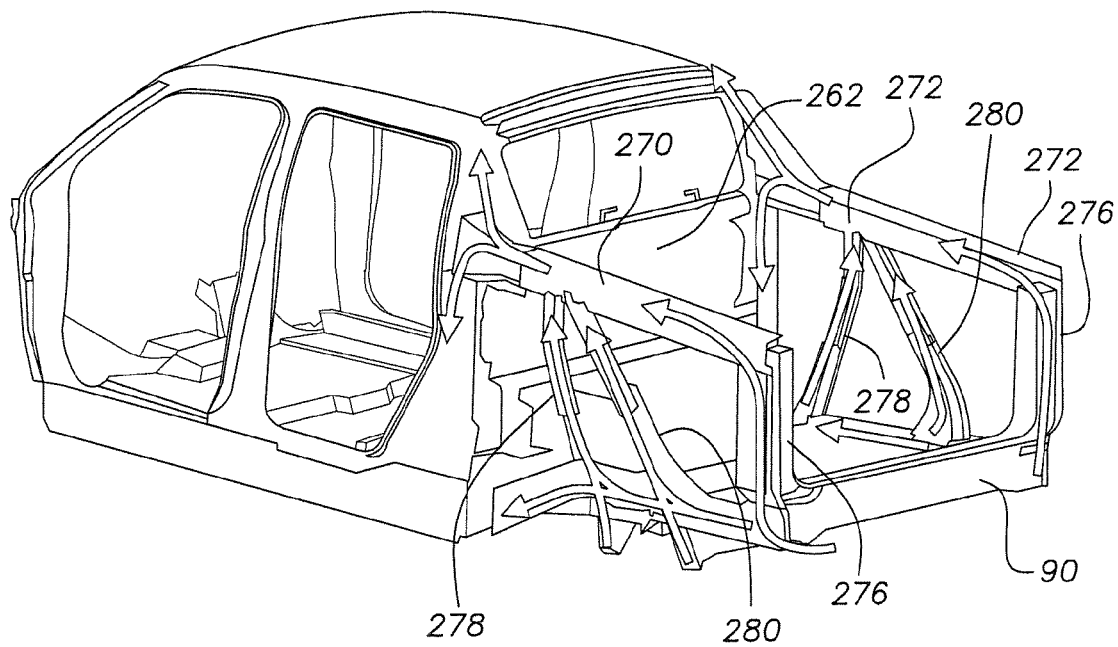
FIG. 29 is a view of the vehicle frame similar to FIG. 28 but shown with portions broken away to show load paths through a rear frame assembly of the vehicle frame.

With reference to FIGS. 28 and 29, further details will be described in connection with the upper frame rails 270, 272 of the first vehicle type (FIG. 24) but such details are applicable to the other vehicle types unless indicated otherwise. Both an inner panel (not shown) and an outer panel 290 can be joined to the upper rails 270, 272 to form a load-carrying bed, and particularly side walls thereof. An upper-transition joining portion 292 can be employed to join forward ends of the upper rails 270, 272 to the respective rear cab pillar areas 274. In particular, the upper-transition joining portion 292 can be a stamped member and can function as a transition joint between the associated upper bed rail 270 or 272 and a stamped member. For example, the upper-transition joining portion 292 can join the front portion of the upper bed rail 272 to the adjacent rear cab pillar area 274.

The forward support beam 278 can be generally vertically oriented and can be generally perpendicular to the upper rail 270 or 272. The rear-diagonal support beam 280 can be diagonally oriented with respect to the bed rail 270 or 272. Both of the support beams 278, 280 associated with each of the upper rails 270, 272 can be one-piece roll-formed members, though this is not required.

As shown in FIG. 29, energy load paths represented by arrows are shown. The load paths are paths that the energy load resulting from a rear-end collision would likely travel. As the drawing shows, the load from a rear-end collision would likely be disbursed through each member comprising the rear frame assembly 58 or 60. More specifically, such a load would be transmitted upward through the supports 278, 280 and the rear bed pillar 276 to the adjacent upper rail 270 or 272 and then to the rear can pillar area 274. As shown, the load is distributed over multiple load paths which advantageously allows for better energy absorption and dissipation.

The frame assemblies described herein are described as including several variable length components, such as roll-formed members. These members are disclosed as being combined with several stamped members to provide an efficient method of manufacturing a vehicle frame assembly, while advantageously improving rigidity and safety. It should be noted, however, that the roll-formed members can be replaced with stamped members. While this may increase manufacturing costs over the utilization of roll-formed members, the improved efficiency and safety realized from the frame assemblies disclosed herein would not be sacrificed.

As is generally known in the art, roll-formed components, such as the side sill members 46, 48, the center frame member 44 and the upper bed rails 270, 272 (and the longitudinally elongated equivalents of these frame components), can be formed in a continuous process by dispensing sheet steel from a roll, punching the sheet steel, if desired, and then forming the steel into the desired shape by passing the steel through a series of progressive roller dies. Such forming can be very economical and can provide an "endless" length of identical roll-formed parts that may thereafter be cut to a desired length. Accordingly, the right and left side sills for any vehicle model or type can be easily formed by cutting identical-length pieces from a continuous or uninterrupted length of "side sill stock." Similarly, a particular center frame member can be formed by cutting a predetermined length from an endless or uninterrupted piece of "center tunnel or frame stock." Still further, rear frame assembly longitudinal frame components (e.g., upper rails 270, 272) can be formed by cutting a predetermined length from an endless or uninterrupted piece of upper rail stock.

In practice, the side sill member stock, the center frame member stock, the upper rail stock, etc. can be formed at a location that is geographically remote from the location of final vehicle assembly, and shipped to the manufacturing facility. For example, a stack of a particularly desired length of side sills may be shipped on one pallet, while a particularly desired length of center frame members may be shipped on another pallet. Alternatively, stacks of center frame members and corresponding side sill members can be shipped together on one pallet, or a center frame member and a pair of side sill members can be shipped together as a kit. Further, in some situations it may be desired to roll-form the side sill members and the center frame members at an assembly facility such that the side sill members and the center frame members are cut from the respective stock lengths shortly before being delivered to the frame loading station for integration into the lower frame assembly. As will be apparent to one skilled in the art from the foregoing, although the roll-formed components are all formed in the same general way, the location and timing of manufacture of the roll-formed components is flexible and easily adapted to various manufacturing and assembly environments.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle frame system for use on a plurality of unibody vehicle types having varying longitudinal bed lengths, comprising:
    at least a first vehicle type having a unibody frame including a first front frame assembly, a first floor frame assembly and a first rear frame assembly, said first rear frame assembly including at least one longitudinal frame member having a first longitudinal length, and said first floor frame assembly including a first floor center frame member and a pair of first floor side sill members flanking said first floor center frame; and
    at least a second vehicle type having a unibody frame including a second front frame assembly, a second floor frame assembly and a second rear frame assembly, said second rear frame assembly including at least one longitudinal frame member having a second longitudinal length, said second floor frame assembly including a second floor center frame member and a pair of second floor side sill members flanking said second floor center frame member, wherein one or more of said longitudinal frame members of said first and second rear frame assemblies has a cross-sectional profile that remains constant along at least a longitudinal portion thereof allowing said one or more members to be cut at a first location along said longitudinal portion corresponding to said first longitudinal length when included in said first rear frame assembly and at a second location along said longitudinal portion corresponding to said second longitudinal length when included in said second rear frame assembly, wherein each of said first and second rear frame assemblies includes a pair of side members extending from said pair of first and second side sill members of said respective first and second floor frame assemblies, wherein a frame joint between each rear frame side member and each side sill member includes an upper wall of said rear frame side member overlapping an upper wall of said side sill member along a region of said side sill member and a lower wall of said rear frame side member overlapping a lower wall of said side sill member along the same region of the side sill member, and wherein a common front frame assembly is secured to each of said first floor frame assembly of said at least a first vehicle type and said second floor frame assembly of said at a second vehicle type, said common front frame assembly connected directly to each of said pair of first and second floor side sill members and said first and second center frame members.

2. The vehicle frame system of claim 1 wherein said longitudinal portion is an entire longitudinal extent of said longitudinal members.

3. The vehicle frame system of claim 2 wherein said longitudinal members are roll formed.

4. The vehicle frame system of claim 3 wherein said longitudinal members include upper bed rails of said first and second rear frame assemblies.

5. The vehicle frame system of claim 1 wherein said longitudinal members include upper bed rails of said first and second rear frame assemblies, and wherein each of said upper bed rails extends from a rear pillar toward a rear end of said rear frame assembly.

6. The vehicle frame system of claim 5 wherein a plurality of cross braces extend between said side members, and said upper bed rails spaced apart from said side members and connected thereto via a plurality of reinforcing support beams.

7. The vehicle frame system of claim 1 wherein said first and second floor frame assemblies are common with one another.

8. The vehicle frame system of claim 1 wherein said first floor frame assembly has a first longitudinal length and said second floor frame assembly has a second longitudinal length that varies relative to said longitudinal length of said first floor frame assembly.

9. A vehicle frame system, comprising:
a single center frame member;
side sill members flanking and spaced apart equal distances from said center frame member; and
a bed frame assembly having a longitudinal frame component, said longitudinal frame component formed at a first length when used on a first vehicle type having a first floor frame assembly with a first floor frame longitudinal length and formed at a second length when used on a second vehicle type having a second floor frame assembly with a second floor frame longitudinal length, wherein said longitudinal frame component is at least one unibody frame component, and wherein each of said center frame member and said side sill members extends along a substantial portion of said first floor frame longitudinal length or said second floor frame longitudinal length, wherein said longitudinal frame component is one of a side member and a bed rail, said side member extending from one of said side sill members, wherein a frame joint between said side member and said one side sill member includes an upper wall of said side member overlapping an upper wall of said one side sill member, a lower wall of said side member overlapping a lower wall of said one side sill member, and a side wall of said side member overlapping a side wall of said one side sill member.

10. The vehicle frame system of claim 9 wherein said longitudinal frame component is a bed rail.

11. The vehicle frame system of claim 10 wherein said bed rail has a cross-section that remains constant along an entire longitudinal length of said bed rail.

12. A vehicle frame construction method for forming vehicles having varying longitudinal bed lengths on vehicles having unibody frames, comprising:
forming at least one first longitudinal frame component having a first longitudinal length for a first vehicle type having a unibody frame;
forming at least one second longitudinal frame component having a second longitudinal length for a second vehicle type having a unibody frame, wherein said at least one first longitudinal frame component and said at least one second longitudinal component are side members;
installing said first longitudinal frame component on a first bed frame assembly of said first vehicle type; and
installing said second longitudinal component on a second bed frame assembly of said second vehicle type, wherein said pair of side members extends along a substantial portion of said first bed frame longitudinal length or said second bed frame longitudinal length,
the method further comprising:
connecting each side member to a respective side sill member by overlapping an upper wall of each side member with an upper wall of said respective side sill member and overlapping a lower wall of each side member with a lower wall of said respective side sill member; and
overlapping one of the upper wall and lower wall of each side member and the corresponding upper wall and lower wall of each respective side sill member with a reinforcing member.

* * * * *